United States Patent [19]

Okada et al.

[11] Patent Number: 5,552,911

[45] Date of Patent: Sep. 3, 1996

[54] COLOR LIQUID CRYSTAL DISPLAY DEVICE HAVING VARYING CELL THICKNESS AND VARYING PIXEL AREAS

[75] Inventors: Shinjiro Okada, Isehara; Yutaka Inaba, Kawaguchi; Makoto Kojima, Hino; Kazunori Katakura, Atsugi, all of Japan

[73] Assignee: Canon Kabushiki Kaisha, Tokyo, Japan

[21] Appl. No.: 136,268

[22] Filed: Oct. 15, 1993

[30] Foreign Application Priority Data

Oct. 19, 1992 [JP] Japan ..................................... 4-304411

[51] Int. Cl.⁶ ....................... G02F 1/1343; G02F 1/1335
[52] U.S. Cl. .................................. 359/68; 359/54; 359/50; 359/87; 359/100
[58] Field of Search .................................. 359/54, 56, 68, 359/100, 48, 50; 345/88, 89, 149

[56] References Cited

U.S. PATENT DOCUMENTS

| | | | |
|---|---|---|---|
| 4,470,667 | 9/1984 | Okubo et al. | 350/339 F |
| 4,639,089 | 1/1987 | Okada et al. | 350/341 |
| 4,655,561 | 4/1987 | Kanbe et al. | 350/350 S |
| 4,671,058 | 8/1988 | Okubo et al. | 350/331 T |
| 4,681,404 | 7/1987 | Okada et al. | 350/350 S |
| 4,712,874 | 12/1987 | Sekimura et al. | 350/339 F |
| 4,712,877 | 12/1987 | Okada et al. | 350/350 S |
| 4,712,878 | 12/1987 | Taniguchi et al. | 350/350 S |
| 4,714,636 | 12/1987 | Yokono et al. | 428/1 |
| 4,733,948 | 3/1988 | Kitahara | 350/339 F |
| 4,744,637 | 5/1988 | Sekimura et al. | 350/339 R |
| 4,747,671 | 5/1988 | Takahashi et al. | 350/336 |
| 4,786,148 | 11/1988 | Sekimura et al. | 350/339 F |
| 4,796,980 | 1/1989 | Kaneko et al. | 350/350 S |
| 4,802,743 | 2/1989 | Takao et al. | 350/339 F |
| 4,802,744 | 2/1989 | Shindo et al. | 350/350 S |
| 4,818,075 | 4/1989 | Takao et al. | 350/339 F |
| 4,911,733 | 3/1990 | Matsumoto et al. | 8/471 |
| 4,917,471 | 4/1990 | Takao et al. | 350/339 F |
| 4,929,061 | 5/1990 | Tominaga et al. | 350/338 |

| | | | |
|---|---|---|---|
| 5,059,000 | 10/1991 | Kaneko et al. | 350/351 |

(List continued on next page.)

FOREIGN PATENT DOCUMENTS

| | | |
|---|---|---|
| 0330428 | 8/1989 | European Pat. Off. . |
| 218022 | 8/1992 | Japan . |

OTHER PUBLICATIONS

Patent Abstracts of Japan, vol. 11, No. 40 (Feb. 5, 1987) (P-544).
Patent Abstracts of Japan, vol. 16, No. 39 (Jan. 30, 1992) (P-1305).
Patent Abstracts of Japan, vol. 16, No. 500 (Oct. 15, 1992) (P-1437).
Clark et al., Ferroelectric Liquid Crystal Electro-Optics Using the Surface Stabilized Structure, *Mol. Cryst. Liq. Cryst.*, vol. 94 (1983) 213–34.

*Primary Examiner*—William L. Sikes
*Assistant Examiner*—Tai V. Duong
*Attorney, Agent, or Firm*—Fitzpatrick, Cella, Harper & Scinto

[57] ABSTRACT

A liquid crystal display device is constituted by a pair of electrode plates each having a plurality of elongated electrodes, and a layer of ferroelectric liquid crystal disposed between the electrode plates so as to form a pixel at each intersection of elongated electrodes disposed respectively on the pair of electrodes plates. At least one electrode plate is provided with an unevenness at each pixel so as to form a cell thickness gradient within each pixel, and at least one electrode plate is provided with at least three types of color filters each corresponding to a pixel. Further, each color filter and/or each pixel is set to have an area and/or a shape varying depending on a local cell thickness so that light quantities or sensible light quantities transmitted through the respective filters and the liquid crystal layer are identical to each other regardless of the type of color filter. A similar pixel pattern deformation is effective for providing a linear T (transmittance)—log V (voltage) characteristic. Color pixels pattern deformation may preferably be effected in a complementary manner with respect to different colors.

13 Claims, 15 Drawing Sheets

U.S. PATENT DOCUMENTS

| | | | |
|---|---|---|---|
| 5,078,475 | 1/1992 | Sekimura et al. | 359/68 |
| 5,101,289 | 3/1992 | Takao et al. | 359/68 |
| 5,177,627 | 1/1993 | Ishiwata et al. | 359/68 |
| 5,185,059 | 2/1993 | Nishida et al. | 156/659.1 |
| 5,264,954 | 11/1993 | Okada | 359/87 |
| 5,317,437 | 5/1994 | Katakura | 359/68 |
| 5,408,246 | 4/1995 | Inaba et al. | 345/89 |

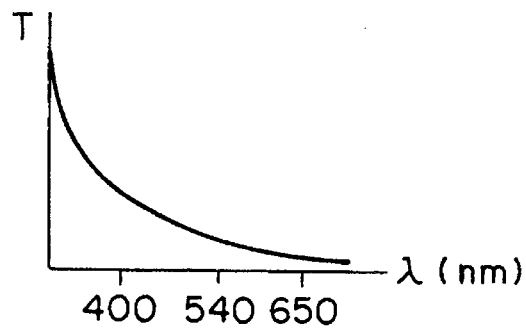
FIG. IA
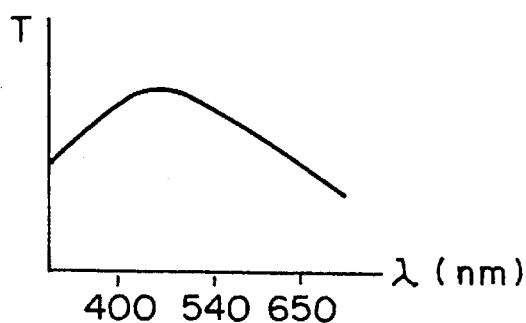
FIG. IB
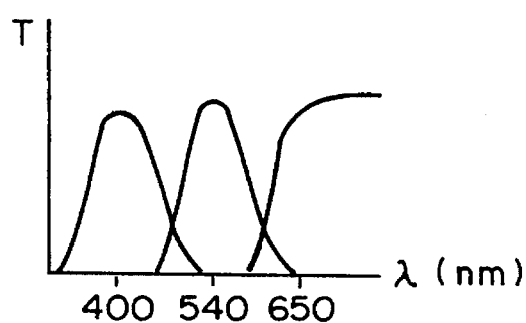
FIG. IC
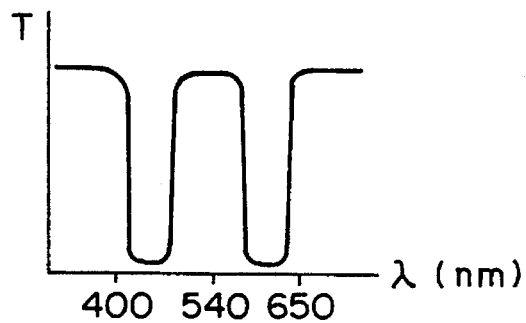
FIG. ID
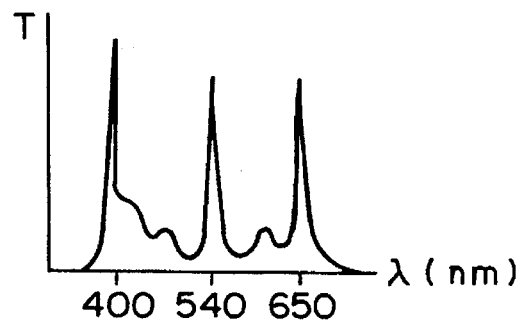
FIG. IE

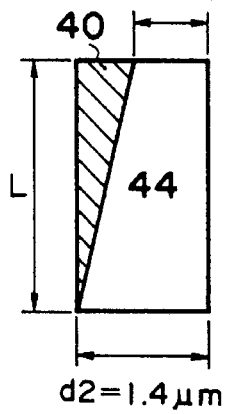
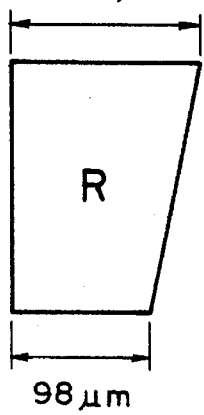
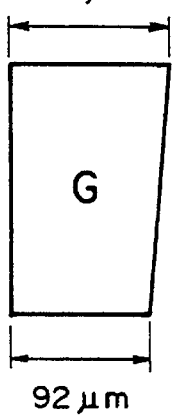
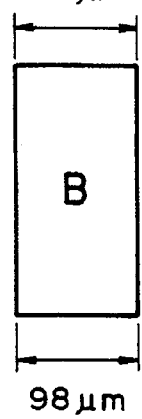
FIG.10(a)  FIG.10(b)  FIG.10(c)  FIG.10(d)
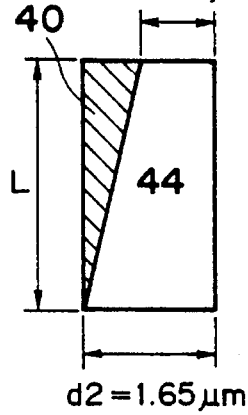
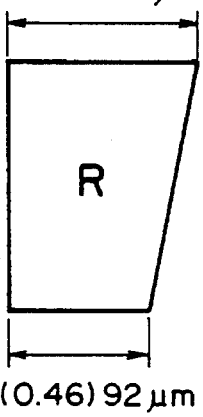
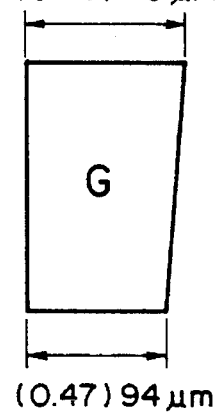
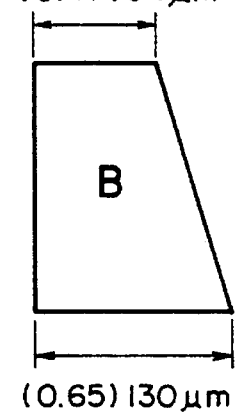
FIG.11(a)  FIG.11(b)  FIG.11(c)  FIG.11(d)

COLOR LIQUID CRYSTAL DISPLAY DEVICE HAVING VARYING CELL THICKNESS AND VARYING PIXEL AREAS

FIELD OF THE INVENTION AND RELATED ART

The present invention relates to a liquid crystal display device for use in display apparatus for computer terminals, television receivers, word processors, typewriters, etc., a light valve for projectors, a view finder for video camera recorders, etc.

Liquid crystal display devices including those using twisted-nematic (TN) liquid crystals, quest-host-type liquid crystals, smectic (Sm) liquid crystals, etc. are known.

Such a liquid crystal is disposed between a pair of substrates and changes in optical transmittance therethrough depending on voltages applied thereto.

A method of controlling the electric field intensity applied to such a liquid crystal layer is described in detail in U.S. Pat. No. 4,712,877.

According to the method, there are formed regions of a liquid crystal layer having different thicknesses in a unit pixel so as to apply different electric field intensities to the liquid crystal layer depending on the regions even when an identical voltage is supplied. The method is applicable not only to a TN liquid crystal but also to a ferroelectric liquid crystal (FLC) to effect a good gradational or grey-scale display.

In such a display device, however, there has been observed a phenomenon that a displayed image deviates from an image designed to be displayed depending on gradation levels.

As a result of our intensive study, we have found that the above phenomenon is caused by different light intensities transmitted through a liquid crystal layer depending on regions due to birefringence of the liquid crystal layer.

SUMMARY OF THE INVENTION

An object of the present invention is to provide a liquid crystal display device having solved the above-mentioned technical problem and capable of effecting good image display.

Another object of the present invention is to provide a liquid crystal display device having different electrode areas corresponding to different liquid crystal layer thicknesses.

A further object of the present invention is to provide a liquid crystal display device having different characteristics and/or shapes of color filters corresponding to different liquid crystal layer thicknesses.

According to the present invention, there is provided a liquid crystal display device, comprising: a pair of electrode plates disposed opposite to each other and each having at least one electrode on an opposite side thereof, and a liquid crystal disposed between the electrode plates, so as to form a plurality of pixels each comprising the liquid crystal and a pair of electrodes sandwiching the liquid crystal, wherein at least one electrode plate is provided with plural types of filters disposed corresponding to pixels, so that pixels corresponding to different types of filters are formed in different areas.

According to another aspect of the present invention, there is provided a liquid crystal display device, comprising: a pair of electrode plates disposed opposite to each other and each having at least one electrode on an opposite side thereof, and a layer of liquid crystal disposed between the electrode plates, so as to form a plurality of pixels each comprising the liquid crystal and a pair of electrodes sandwiching the liquid crystal, wherein the liquid crystal layer within a pixel is caused to have different thicknesses and the shape of the pixel is varied corresponding to the different thicknesses.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A–1E are graphs showing spectral transmittance characteristics of optical means used in a liquid crystal display device according to the invention.

FIGS. 10(a)–10(d) are schematic illustrations of pixel structures in Example 1.

FIGS. 11(a)–11(d) are schematic illustrations of pixel structures in Example 2.

DESCRIPTION OF THE PREFERRED EMBODIMENTS

In a preferred embodiment of the present invention, a deviation in transmittance through a pixel in a halftone display is corrected by modifying the areas of regions in the pixel.

Such a pixel is ordinarily defined as a combination of an overlapping portion of electrodes respectively disposed on a pair of electrode plates, and a filter and/or a masking member disposed according to necessity.

Hereinbelow, the embodiment will be described based on specific examples.

In a system for effecting a gradational display by changing the thickness of a liquid crystal layer in a pixel, the intensity of light passing through the liquid crystal layer can vary due to the birefringence of the liquid crystal layer. A transmission intensity ratio R (=intensity ratio between transmitted light and incident light, i.e., a transmittance) is generally expressed by the following formula:

$$R \propto \sin^2(\pi \cdot \Delta n \cdot d/\lambda),$$

wherein $\lambda$ denotes the wavelength of light; d, the thickness of a liquid crystal layer; and $\Delta n$, the refractive index anisotropy of the liquid crystal layer.

Accordingly, a specific wavelength fraction of light relatively easily transmitted can vary depending on the liquid crystal layer thickness (i.e., a so-called cell thickness) d.

FIGS. 1A–1E are graphs showing spectral characteristics of liquid crystal cells, a color filter, an optical filter and a light source, respectively.

More specifically, FIGS. 1A and 1B show liquid crystal cells having liquid crystal layer thicknesses (cell thicknesses) of 1.0 μm and 1.5 μm, respectively. A ferroelectric liquid crystal has a refractive index anisotropy $\Delta n$ in the range of about 0.15–0.19. FIG. 1A shows a higher transmittance at a wavelength ($\lambda$) of about 400 nm and a low transmittance in the neighborhood of 650 nm. In contrast thereto, in FIG. 1B, the transmittance at about 400 nm is lowered but the transmittance at about 650 nm is increased.

At about 540 nm, there is also observed a difference in transmittance though it is not so remarkable as those at 400 nm and 650 nm.

If a spectral intensity for R (red) (at $\lambda$=650 nm) in FIG. 1 is set to 1 as a reference value, spectral intensities at R (650 nm), G (540 nm) and B (400 nm) may be relatively indicated as shown in the following Table 1.

TABLE 1

|  | R 650 nm | G 540 nm | B 400 nm |
| --- | --- | --- | --- |
| FIG. 1A | 1 | a | b |
| FIG. 1B | c | d | e |

If the regional areas for the cell thicknesses (1.0 μm and 1.5 μm) corresponding to FIGS. 1A and 1B are relatively set as shown in the following Table 2, the transmitted light quantities (=transmittance (per unit area)×area) may be identical to each other for the respective wavelengths.

TABLE 2

|  | R 650 nm | G 540 nm | B 400 nm |
| --- | --- | --- | --- |
| FIG. 1A | 1 | 1/a | 1/b |
| FIG. 1B | 1/c | 1/d | 1/e |

Figure 2:
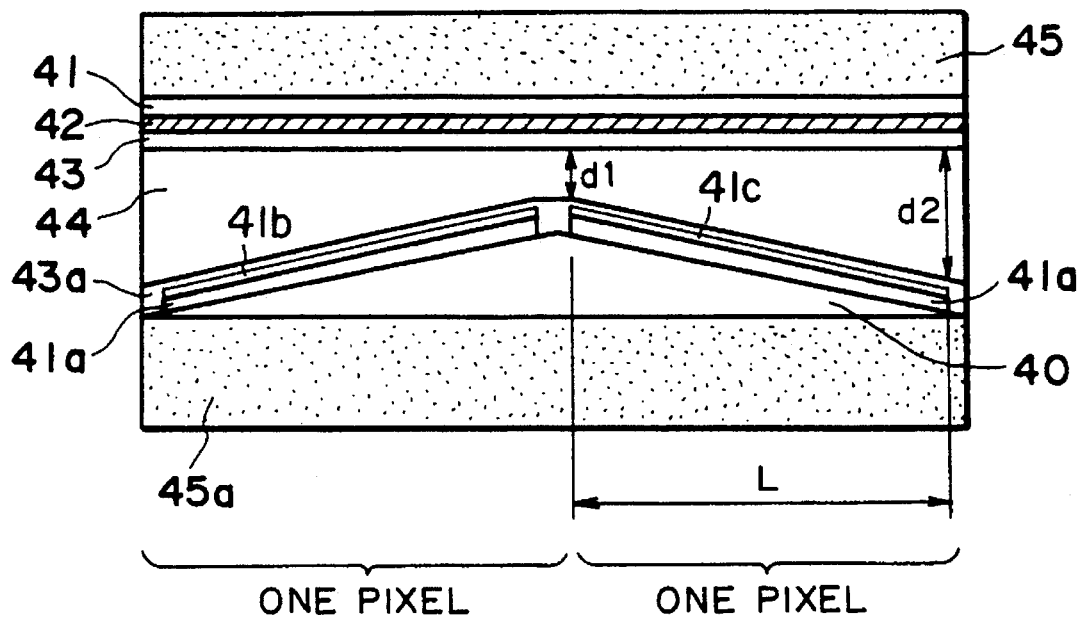
FIG. 2 is a schematic sectional view of a liquid crystal cell used in a liquid crystal display device according to the invention.

FIG. 2 schematically illustrates a section corresponding to two pixels of a liquid crystal cell according to the invention.

Referring to FIG. 2, in the liquid crystal cell, an electrode 41, an insulating film 42 and an alignment film 43 are disposed in flat layers on one substrate 45. On the other substrate 45a, a member 40 providing sloping surfaces is disposed, and thereon, electrodes 41a are formed for the respective pixels and are coated with an alignment film 43a. In this case, the electrode 41 on the upper substrate 45 are disposed common to the two pixels.

The cell thickness in a pixel shown in FIG. 2 varies continuously from $d_1$ to $d_2$ in a surface direction on the substrate and, if the relative area at each cell thickness $d_i$ ($d_1 \leq d_i \leq d_2$) is standardized so as to provide an identical transmitted light intensity corresponding to the cell thickness $d_i$, the above-mentioned phenomenon of varying transmitted light quantities due to varying cell thicknesses can be obviated.

Figure 3A:
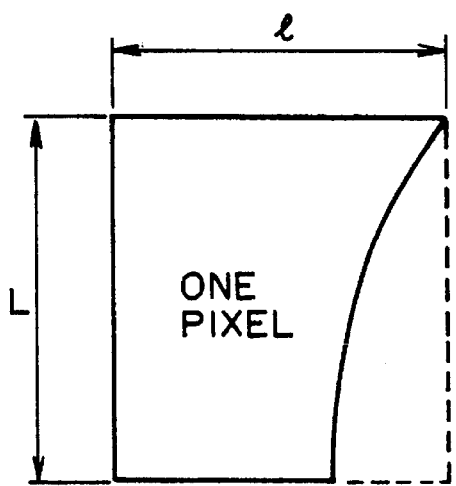
FIGS. 3A and 3B are schematic views for describing a basic design concept regarding pixel structure according to the invention.
Figure 3B:
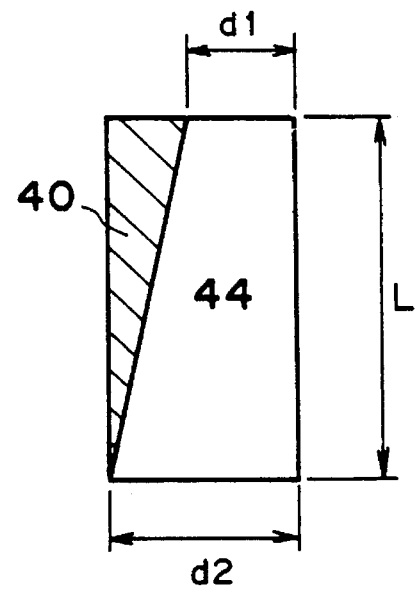

FIGS. 3A and 3B are schematic views showing a set of a pixel pattern and a cell thickness distribution in a pixel. Conventionally, a pixel has been provided in a rectangular pattern as represented by a dotted line in FIG. 3A. In contrast thereto, in the present invention, the pixel width 1 is varied in the direction of cell thickness gradient, i.e., L direction. As a result, in each pixel, a portion having a small transmittance per unit area is caused to have an increased width 1 to increase the transmitted light quantity, and a portion having a larger transmittance per unit area is caused to have a decreased width 1 to reduce the transmitted light quantity.

In an actual liquid crystal cell, the pixel area may be varied in several manners.

Figures 4A, 4B:
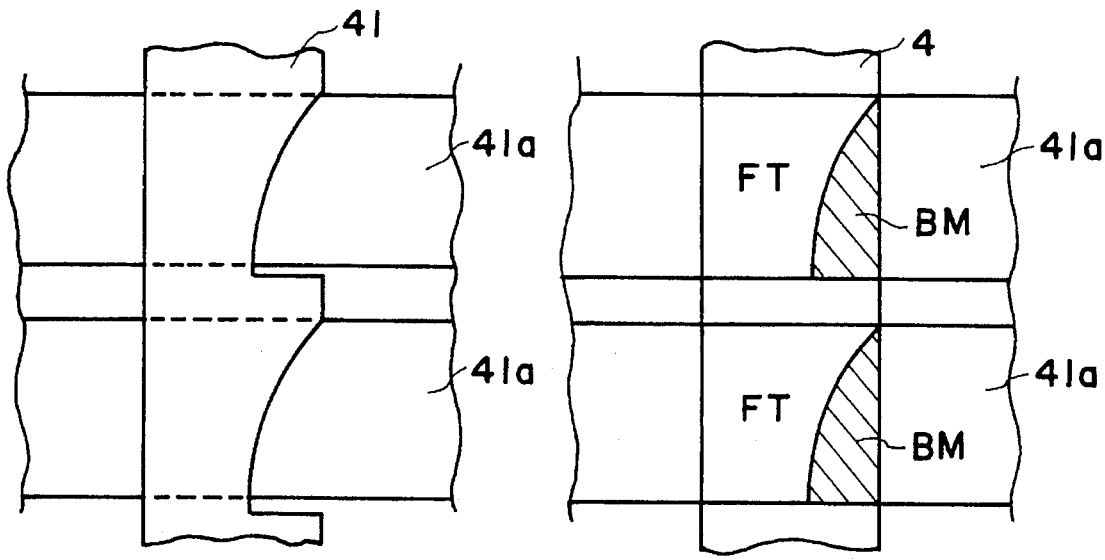
FIGS. 4A and 4B are schematic views for describing a pixel structure according to the invention.

FIGS. 4A and 4B show typical examples thereof. In these figures, only two pixels are shown for example, but a large display picture area may generally be composed of at least 100 pixels. FIG. 4A shows a pixel pattern wherein one-side electrode 41 is provided with a lack based on the above-mentioned design concept. Of course such a lack can be alternatively provided to the other side electrode 41a, or the both sides of electrodes 41 and 41a.

FIG. 4B shows an example wherein electrodes 41 and 41a are free from lacks but filter 41b (red) and filter 41c (green) for example, disposed in superposition at pixels are provided with a lack based on the above concept. The lack may be composed by a masking member BM as shown. As shown in further embodiments described hereinafter, if other pixels provided with appropriate shapes of lacks are combined so as to provide an increased pixel arrangement, such pixels having lacks formed by filters may be constituted without using such a masking member BM.

The liquid crystal used in the present invention may be selected from known TN-liquid crystals, ferroelectric liquid crystals, anti-ferroelectric liquid crystals, etc. Examples thereof may include: TN-liquid crystals inclusive of Schiff base-type liquid crystals, such as alkoxybenzylidene alkylaniline and alkylalkoxyazobenzene, phenylbenzoate-type liquid crystals, cyanobiphenyl-type liquid crystals, cyclohexylcarboxylic acid ester liquid crystals, and 2,3-difluorophenylene-type liquid crystals; and smectic liquid crystals, such as DOBAMBC and HOBACPC.

The electrodes 41 and 41a used in the present invention may comprise a transparent conductor film such as that of tin oxide, indium tin oxide and indium tin oxide, which may be locally supplemented with a metal conductive film according to necessity for lowering the resistance.

The member 40 for providing an unevenness so as to cause a cell thickness distribution in a pixel may be composed of an optically transparent resin or inorganic material.

In the case where a filter is used in the present invention, it is possible to use filters as disclosed in U.S. Pat. Nos. 4,712,874, 4,802,743, 4,786,148, etc.

Gradational display may be performed by driving methods as disclosed in, e.g., U.S. Pat. Nos. 4,747,671, 4,796, 980, and 4,712,877.

Next, description will be made on an embodiment wherein a pixel structure as described above is used in combination with a ferroelectric liquid crystal to constitute a liquid crystal cell.

Display devices using a ferroelectric liquid crystal (FLC) have been described in, e.g., U.S. Pat. Nos. 4,639,089, 4,655,561 and 4,681,404. In the present invention, it is possible to use a liquid crystal cell as disclosed in these U.S. Patents, wherein a pair of transparent substrate respectively having thereon a transparent electrode and subjected to an aligning treatment are disposed to be opposite to each other with a cell gap of about 1–3 μm therebetween so that their transparent electrodes are disposed on the inner sides to form a blank cell, which is then filled with a ferroelectric liquid crystal.

The above-type of liquid crystal display device using a ferroelectric liquid crystal has two advantages. One is that a ferroelectric liquid crystal has a spontaneous polarization so that a coupling force between the spontaneous polarization and an external electric field can be utilized for switching. Another is that the long axis direction of a ferroelectric liquid crystal molecule corresponds to the direction of the spontaneous polarization in a one-to-one relationship so that the switching is effected by the polarity of the external electric field.

A ferroelectric liquid crystal generally comprises a chiral smectic liquid crystal (SmC* or SmH*), of which molecular long axes form helixes in the bulk state of the liquid crystal. If the chiral smectic liquid crystal is disposed within a cell having a small gap of about 1–3 μm as described above, the helixes of liquid crystal molecular long axes are unwound. This phenomenon is reported in, e.g., N. A. Clark, et al., MCLC (1983), Vol. 94, p.p. 213–234.

A ferroelectric liquid crystal has been principally used in a binary (bright-dark) display device in which two stable states of the liquid crystal are used as a light-transmitting state and a light-interrupting state but can be used to effect a multi-value display, i.e., a halftone display. In a halftone display method, the a real ratio between bistable states (light transmitting state and light-interrupting state) within a pixel is controlled to realize an intermediate light-transmitting state. The gradational display method of this type (hereinafter referred to as an "areal modulation" method) will now be described in detail.

Figures 5A, 5B:
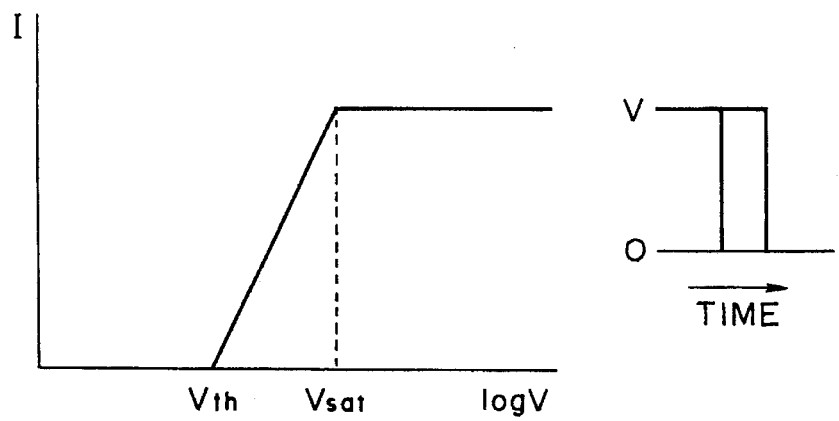
FIGS. 5A an 5B are graphs illustrating a relationship between a switching pulse voltage and a transmitted light quantity.
Figures 6A, 6B, 6C, 6D:
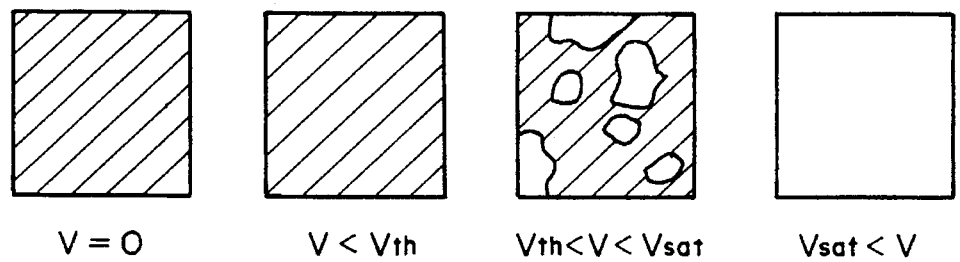
FIGS. 6A–6D illustrate pixels showing various transmittance levels depending on applied pulse voltage.

FIG. 5 is a graph schematically representing a relationship between a transmitted light quantity I through a ferroelectric liquid crystal cell and a switching pulse voltage V. More specifically, FIG. 5A shows plots of transmitted light quantities I given by a pixel versus voltages V when the pixel initially placed in a complete light-interrupting (dark) state is supplied with single pulses of various voltages V and one polarity as shown in FIG. 5B. When a pulse voltage V is below threshold Vth (V<Vth), the transmitted light quantity does not change and the pixel state is as shown in FIG. 6B which is not different from the state shown in FIG. 6A before the application of the pulse voltage. If the pulse voltage V exceeds the threshold Vth (V>Vth), a portion of the pixel is switched to the other stable state, thus being transitioned to a pixel state as shown in FIG. 6C showing an intermediate transmitted light quantity as a whole. If the pulse voltage V is further increased to exceed a saturation value Vsat (Vsat<V), the entire pixel is switched to a light-transmitting state as shown in FIG. 6D so that the transmitted light quantity reaches a constant value (i.e., is saturated).

That is, according to the areal modulation method, the pulse voltage V applied to a pixel is controlled within a range of Vth<V<Vsat to display a halftone corresponding to the pulse voltage.

However, actually, the voltage (V)—transmitted light quantity (I) relationship shown in FIG. 5 depends on the cell thickness and temperature. Accordingly, if a display panel is accompanied with an unintended cell thickness distribution or a temperature distribution, the display panel can display locally different gradation levels in response to a pulse voltage having a constant voltage.

Figure 7:
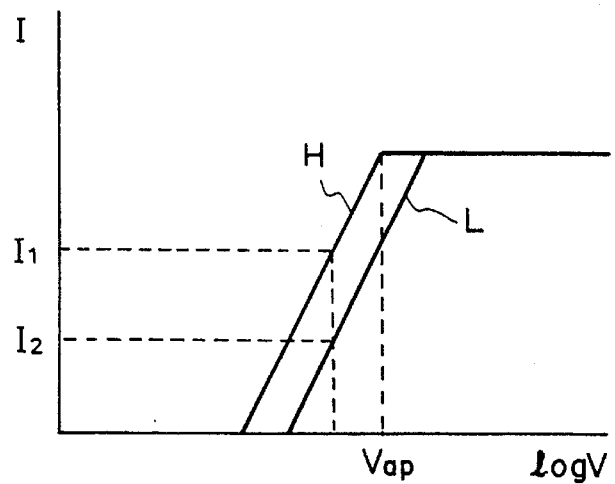
FIG. 7 is a graph for describing a deviation in threshold characteristic due to a temperature distribution.

FIG. 7 is a graph for illustrating the above phenomenon which is a graph showing a relationship between pulse voltage (V) and transmitted light quantity (I) similar to that shown in FIG. 5 but showing two curves including a curve H representing a relationship at a high temperature and a curve L at a low temperature. In a display panel having a large display size, it is rather common that the panel is accompanied with a temperature distribution. In such a case, however, even if a certain halftone level is intended to be displayed by application of a certain drive voltage Vap, the resultant halftone levels can be fluctuated within the range of $I_1$ to $I_2$ as shown in FIG. 7 within the same panel, thus failing to provide a uniform gradational display state.

Figure 8:
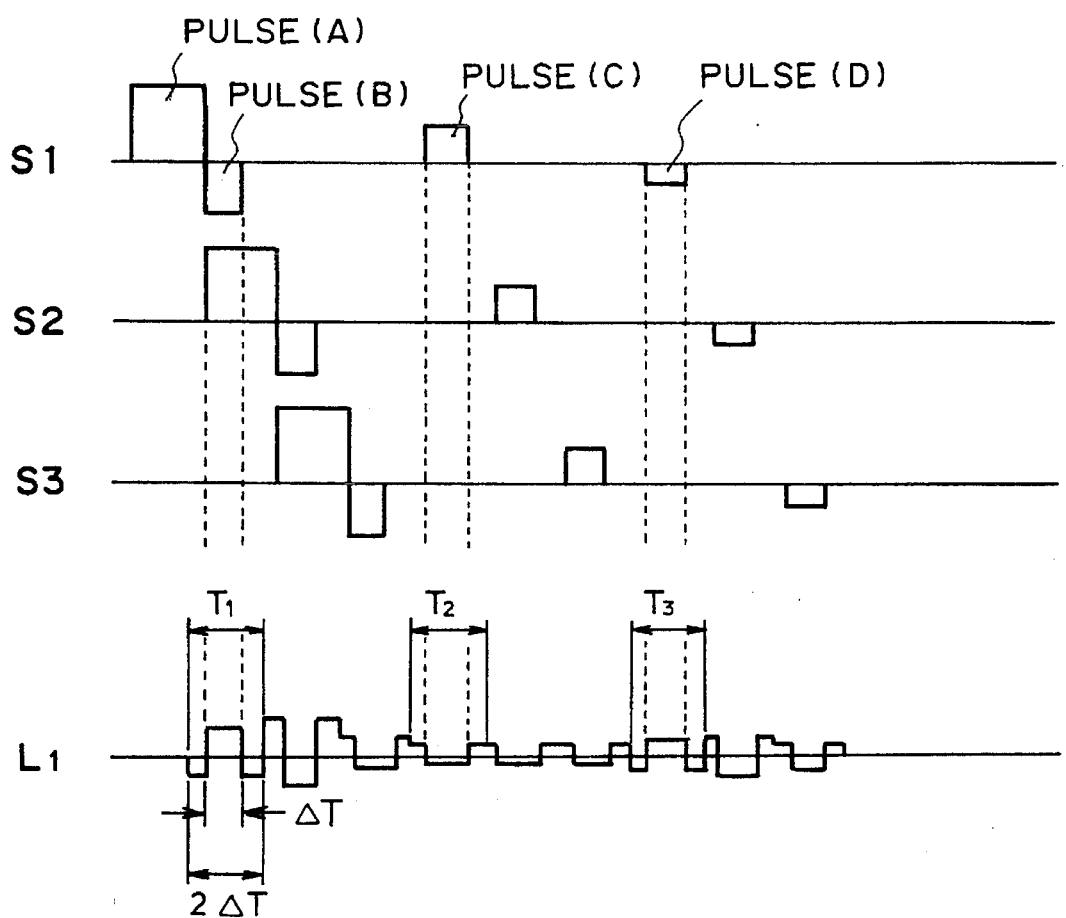
FIG. 8 is a time chart for describing a four-pulse method.
Figure 9:
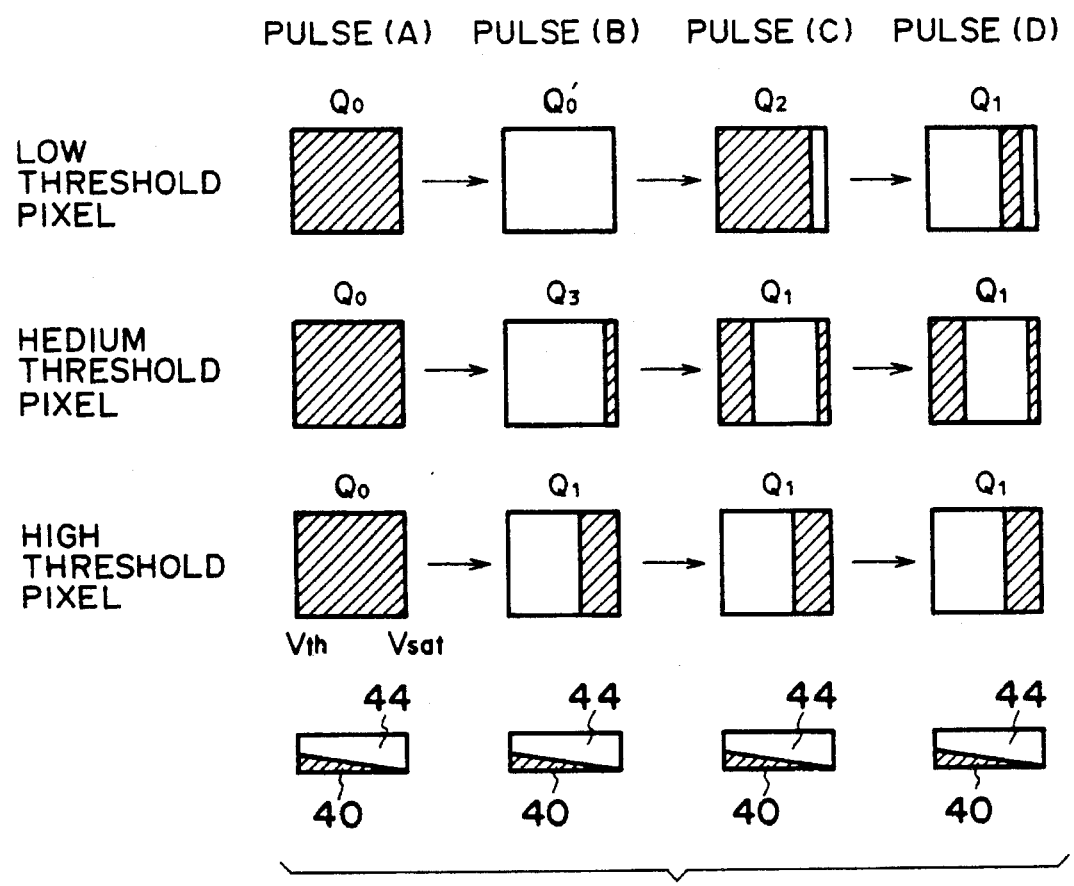
FIG. 9 is an illustration of pixels showing various transmittance levels.

In order to solve the above-problem, our research group has already proposed a drive method (hereinafter referred to as the four pulse method") in Japanese Laid-Open Patent Application (JP-A) 4-218022. In the four pulse method, as illustrated in FIGS. 8 and 9, all pixels having mutually different thresholds on a common scanning line in a panel are supplied with plural pulses (corresponding to pulses (A)–(D) in FIG. 8) to show consequently identical transmitted quantities as shown in FIG. 9. In FIG. 8, $T_1$, $T_2$ and $T_3$ denote selection periods set in synchronism with the pulses (B), (C) and (D), respectively. Further, $Q_0$, $Q_0'$, $Q_1$, $Q_2$ and $Q_3$ in FIG. 9 represent gradation levels of a pixel, inclusive of $Q_0$ representing black (0%) and $Q_0'$ representing white (100%). Each pixel in FIG. 9 is provided with a threshold distribution within the pixel increasing from the leftside toward the right side as represented by a cell thickness increase.

Our research group has also proposed a drive method (a so-called "pixel shift method", as disclosed in U.S. patent application Ser. No. 984,694, filed Dec. 2, 1991 and entitled "LIQUID CRYSTAL DISPLAY APPARATUS"), wherein plural scanning lines are simultaneously supplied with different scanning signals for selection to provide an electric field intensity distribution spanning the plural scanning lines, thereby effecting a gradational display. According to this method, a variation in threshold due to a temperature variation can be absorbed by shifting a writing region over plural scanning lines.

Such drive methods (the four pulse method and the pixel shift method) are effective in drive of a liquid crystal device having pixels each provided with a uniform threshold distribution therein as given by a cell thickness gradient as shown in FIG. 2.

As described above, in a system for effecting a gradational display by changing the thickness of a liquid crystal layer in a pixel, the intensity of light passing through the liquid crystal layer can vary due to the birefringence of the liquid crystal layer. A transmission intensity ratio R (=intensity ratio between transmitted light and incident light, i.e., a transmittance) is generally expressed by the following formula:

$$R \propto \sin^2(\pi \cdot \Delta n \cdot d/\lambda),$$

wherein $\lambda$ denotes the wavelength of light; d, the thickness of a liquid crystal layer; and $\Delta n$, the refractive index anisotropy of the liquid crystal layer.

Accordingly, a specific wavelength fraction of light relatively easily transmitted can vary depending on the liquid crystal layer thickness (i.e., a so-called cell thickness) d.

As a result, in the case of gradational display using a cell having a pixel provided with a cell thickness gradient even if corrected by the above-mentioned four pulse method or the pixel shift method, the change in preferentially transmitted wavelength due to a change in cell thickness causes a change in central transmission wavelength at an identical gradational display level due to a temperature change, thus causing a coloration due to a temperature variation.

Further, in the case of color display by using color filters, transmittances at wavelengths of three primary colors are caused to vary depending on the temperature, so that a color obtained by combining these primary colors is also changed. Thus, not only the brightness but also a balance of tristimulus values (e.g., R, G and B) is disturbed, thus causing a deterioration in quality of a color display device.

In order to solve these problems, we have adopted the measure of varying the electrode area depending on the cell thickness gradient, thus providing a constant transmitted quantity at different cell thicknesses. Thus, in the case where color display is not effected, the electrode area is made relatively large at a small cell thickness and is made relatively small at a large cell thickness, thereby allowing a better gradational display. Further, in the case of color display or monochromatic display requiring a control of spectral transmittance characteristic, the control of color filter areas may be performed for the respective color filters depending on the cell thickness. For example, the color filter areas may be varied depending on the cell thickness in such a manner that red (R) and green (G) filter areas are made relatively larger at a small cell thickness than at a large cell thickness, and a blue filter area is made relatively large at a large cell thickness and relatively small at a small cell thickness. Further, the respective color filters are controlled with respect to entire areal sizes so as to equalize the transmittances through a liquid crystal layer at respective gradation levels, thus minimizing the deviation of color balance depending on gradation levels. Further, in the case of temperature compensation according to the four pulse method, the pixel shift method, etc., a change in color (particularly in color obtained by combination of R, G and B) due to a temperature change can be minimized.

The above effects may be obtained optionally if both the color filters and electrodes are controlled, but a good gradational display can be accomplished by a control of only the electrodes or the filters if the masking part is appropriately set.

EXAMPLE 1

In this example, correction of transmitted light quantity was performed by using a cell having a cell thickness gradient in a pixel as shown in FIG. 2.

Referring to FIG. 2, in this example, the smallest cell thickness $d_1$ was set to 1.0 μm, the largest cell thickness $d_2$ was set to 1.40 μm and the pixel width L was set to 200 μm. The electrodes 41a formed on the slope-providing unevenness members 40 and extending perpendicularly to the drawing were used as scanning electrodes.

In preparation of the cell, a UV (ultraviolet)-curable resin layer was formed on a glass substrate 45a and a mold having an uneven surface was pressed thereto. In this state, the UV-curable resin layer was exposed to UV rays to form a cured resin layer 40 having an unevenness pattern forming sloping sides was formed on the substrate 45a.

The thus formed uneven substrate 45a (with 40) and another glass substrate 45 were respectively coated with ITO films (sheet resistivity of about 30 Ω-square), which were then patterned into electrodes 41a and 41, respectively. Then, the electrodes 41a and 41 on both substrates 40a and 40 were coated with about 400 Å-thick polyimide alignment films 43a and 43 (formed by application and curing of a polyimide-forming liquid ("LQ-1802", mfd. by Hitachi Kasei K. K.)), which were then rubbed in a substantially identical direction substantially perpendicular to the extension of the scanning electrodes 41a.

The thus treated pair of substrates 45a and 45 were disposed opposite to each other with their electrode sides as shown in FIG. 2 and sealed at the periphery except for a liquid crystal injection port to form a blank cell, which was then filled with a chiral smectic liquid crystal A ($\Delta n=0.18$) showing properties inclusive of a phase transition series as shown in Table 3 below, whereby a liquid crystal cell of this example was prepared.

TABLE 3

(liquid crystal A)

$$\text{Iso.} \underset{81.8°C.}{\overset{82.3°C.}{\rightleftarrows}} \text{Ch} \underset{77.3°C.}{\overset{76.6°C.}{\rightleftarrows}} \text{SmA*} \underset{-2.5°C.}{\overset{54.8°C.}{\rightleftarrows}} \text{SmC*} \underset{\text{Cryst}}{\overset{-20.9°C.}{\downarrow}}$$

Ps = −5.8 nC/CM² (30° C.)
Tilt angle = 14.3 deg. (30° C.)
Δε ≈ −0 (30° C.)

FIG. 10(a) shows a sectional view of one pixel of the thus prepared liquid crystal cell having a cell thickness continuously changing from $d_1=1.0$ μm to $d_2=1.4$ μm within a pixel.

Table 4 below shows a table of transmittances per unit area of the cell at various cell thicknesses and at central wavelengths (610 nm, 545 nm and 435 nm) of a three wavelength-fluorescent tube showing a spectral characteristic as shown in FIG. 1E when illuminated with the fluorescent tube as the light source. The transmittances in Table 4 are shown in relative values with the transmittance at a cell thickness of 0.8 μm for light having a wavelength of 610 nm as the reference (i.e., 1).

TABLE 4

| Cell thickness | Transmittance Tr (area ratio = 1/Tr) | | |
|---|---|---|---|
| | R 610 nm | G 545 nm | B 435 nm |
| 1.0 μm | 1.40 (0.71) | 1.63 (0.62) | 2.03 (0.49) |
| 1.1 μm | 1.59 (0.63) | 1.81 (0.55) | 2.15 (0.47) |

TABLE 4-continued

| | Transmittance Tr (area ratio = 1/Tr) | | |
|---|---|---|---|
| Cell thickness | R 610 nm | G 545 nm | B 435 nm |
| 1.2 μm | 1.76 (0.57) | 1.97 (0.51) | 2.19 (0.46) |
| 1.3 μm | 1.91 (0.52) | 2.09 (0.48) | 2.16 (0.46) |
| 1.4 μm | 2.03 (0.49) | 2.16 (0.46) | 2.06 (0.49) |

The transmittances in Table 4 are values per unit area and, at parts having different transmittances, transmitted light quantities are caused to be different. The values in parentheses in Table 4 are reciprocals of the transmittances and represent areal ratios (relative areas) for providing identical transmitted quantities for solving the above problem. Thus, in order to provide an identical transmitted light quantity (represented by 1), the pixel portion areas at various thicknesses may suitably be constituted in areal ratios which are reciprocals of the transmittances at the respective thicknesses.

In a pixel having a cell thickness gradient as shown at FIG. 10(a), the length L in a direction accompanied with a cell thickness gradient is fixed as shown in FIG. 3A, so that the portions of the pixel at various thicknesses may be changed by varying the electrode width 1.

In this example, as shown at (b), (c) and (d) in FIG. 10, the electrode width 1 at a cell thickness $d_1=1.0$ μm was set to 142 μm for an electrode provided with a red (R) filter, 124 μm for an electrode provided with a green (G) filter and 98 μm for an electrode provided with a blue (B) filter. The color filters used herein had central wavelengths which were identical to those of the three-wavelength tube shown in Table 4. The electrode width ratios were determined by reciprocals of the transmittances at a cell thickness=1.0 μm (i.e., equal to areal ratios shown in Table 4).

In this way, the electrode widths of electrodes with respective filters were determined at respective cell thickness portions so as to have areal ratios shown in Table 4. As a result, the electrodes for R, G and B were set to have width of 98 μm, 92 μm and 98 μm, respectively, at the maximum cell thickness $d_2=1.4$ μm. In other words, the electrode with an R filter was caused to have a width changing from 142 μm to 98 μm within one pixel corresponding to the cell thickness change.

The electrodes with G and B filters were also set to have widths changing from 124 μm to 92 μm (G) and from 98 μm to 98 μm (B).

As a result, in the cell of this example constituted in the above-described manner, the transmitted light quantity through each pixel was made identical even at different cell thickness portions and was also made identical to three types of pixels, thereby realizing a good color display.

EXAMPLE 2

In this example, correction of transmitted light quantity was performed by using a cell having a cell thickness gradient in a pixel as shown in FIG. 2 similarly as in Example 1 but having different dimensions of $d_1=1.1$ μm, $d_2=1.65$ μm and L=200 μm.

FIG. 11(a) shows a sectional view of one pixel of the thus prepared liquid crystal cell having a cell thickness continuously changing from $d_1=1.1$ μm to $d_2=1.65$ μm within a pixel.

Table 5 below shows a table of transmittances per unit area of the cell at various cell thicknesses and at central wavelengths (610 nm, 545 nm and 435 nm) of a three wavelength-fluorescent tube showing a spectral characteristic as used in Example 1 when illuminated with the fluorescent tube as the light source. The transmittances in Table 5 are shown in relative values with the transmittance at a cell thickness of 0.8 μm for light having a wavelength of nm as the reference (i.e., 1).

TABLE 5

| | Transmittance Tr (area ratio = 1/Tr) | | |
|---|---|---|---|
| Cell thickness | R 610 nm | G 545 nm | B 435 nm |
| 1.10 μm | 1.59 (0.63) | 1.81 (0.55) | 2.15 (0.47) |
| 1.20 μm | 1.76 (0.57) | 1.97 (0.51) | 2.19 (0.46) |
| 1.30 μm | 1.91 (0.52) | 2.09 (0.48) | 2.16 (0.46) |
| 1.40 μm | 2.03 (0.49) | 2.16 (0.46) | 2.06 (0.49) |
| 1.50 μm | 2.12 (0.47) | 2.19 (0.46) | 1.89 (0.53) |
| 1.60 μm | 2.17 (0.46) | 2.17 (0.46) | 1.67 (0.60) |
| 1.65 μm | 2.19 (0.46) | 2.15 (0.47) | 1.55 (0.65) |

The transmittances in Table 5 are values per unit area and, at parts having different transmittances, transmitted light quantities are caused to be different. The values in parentheses in Table 5 are reciprocals of the transmittances and represent areal ratios (relative areas) for providing identical transmitted quantities for solving the above problem. Thus, in order to provide an identical transmitted light quantity (represented by 1), the pixel portion areas at various thicknesses may suitably be constituted in areal ratios which are reciprocals of the transmittances at the respective thicknesses.

In a pixel having a cell thickness gradient as shown at FIG. 11(a), the length L in a direction accompanied with a cell thickness gradient is fixed as shown in FIG. 3A, so that the portions of the pixel at various thicknesses may be changed by varying the electrode width 1.

In this example, as shown at (b), (c) and (d) in FIG. 11, the electrode width 1 at a cell thickness $d_1=1.1$ μm was set to 126 μm for an electrode provided with a red (R) filter, 110 μm for an electrode provided with a green (G) filter and 94 μm for an electrode provided with a blue (B) filter. The color filters used herein had central wavelengths which were identical to those of the three-wavelength tube shown in Table 5. The electrode width ratios were determined by reciprocals of the transmittances at a cell thickness=1.0 μm (i.e., equal to areal ratios shown in Table 4).

In this way, the electrode widths of electrodes with respective filters were determined at respective cell thickness portions so as to have areal ratios shown in Table 5. As a result, the electrodes for R, G and B were set to have widths of 92 μm, 94 μm and 130 μm, respectively, at the maximum cell thickness $d_2=1.65$ μm. In other words, the electrode with an R filter was caused to have a width changing from 126 μm to 92 μm within one pixel corresponding to the cell thickness change.

The electrodes with G and B filters were also set to have widths changing from 110 μm to 94 μm (G) and from 94 μm to 130 μm (B).

In this way, by setting the cell thickness to change in the range of 1.1–1.65 μm, the electrode width changes for R and B could be complementary to each other as shown in FIGS. 11(b)–(d). More specifically, at a cell thickness $d_1=1.1$ μm, the electrode for R has a width of 126 μm and the electrode for B has a width of 94 μm. On the other hand, at a cell thickness $d_2=1.65$ µm, the electrode for R has a width of 92 µm and the electrode for B has a width of 130 µm. As is better shown in FIG. 12A, the pixel electrodes R, G and B may be disposed at a better planar packing rate to provide a larger aperture rate (ratio of total pixel areas to the entire display area).

Figure 12A:
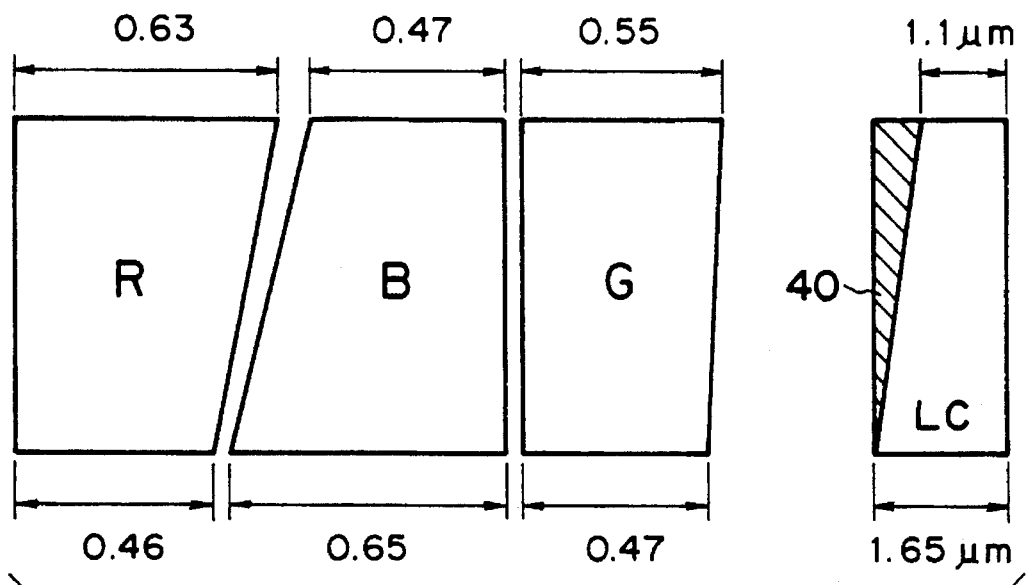
FIGS. 12A and 12B are schematic illustrations for describing modifications of Example 2.
Figure 12B:
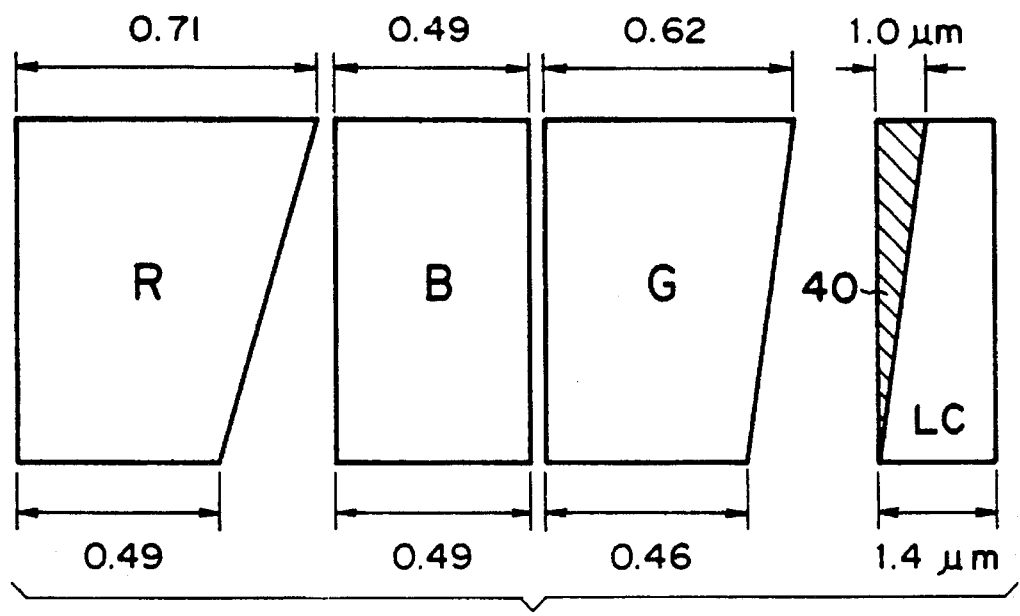

More specifically, the decrease in aperture rate according to the arrangement shown in FIG. 12A given by a cell thickness change in the range of 1.1 µm–1.65 µm was 2.1% compared with that in the case of no electrode change. In contrast thereto, the decrease in aperture rate according to an arrangement shown in FIG. 12 given by a cell thickness change in the range of 1.0 µm–1.40 µm (identical to the one in Example 1) was 10.4%. Thus, it has been demonstrated that an increased aperture ratio can be realized by changing the color filter or electrode arrangement in a complementary relationship in effecting correction of transmitted light quantity corresponding to the cell thickness change.

EXAMPLE 3

An embodiment of providing an improved applied voltage (V)—transmittance (T) by changing the electrode area will now be described.

Figure 13A:
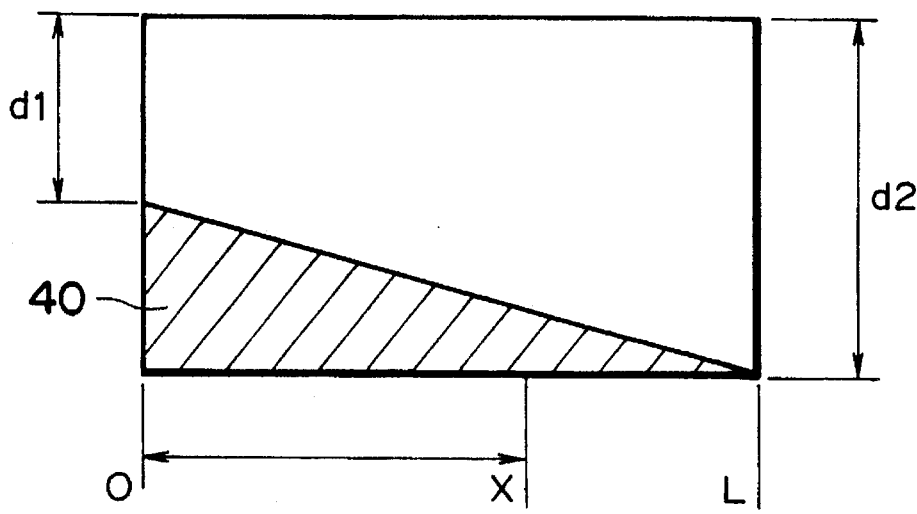
FIGS. 13A and 13B are a schematic sectional view and a schematic plan view of a pixel used in Example 3.
Figure 13B:
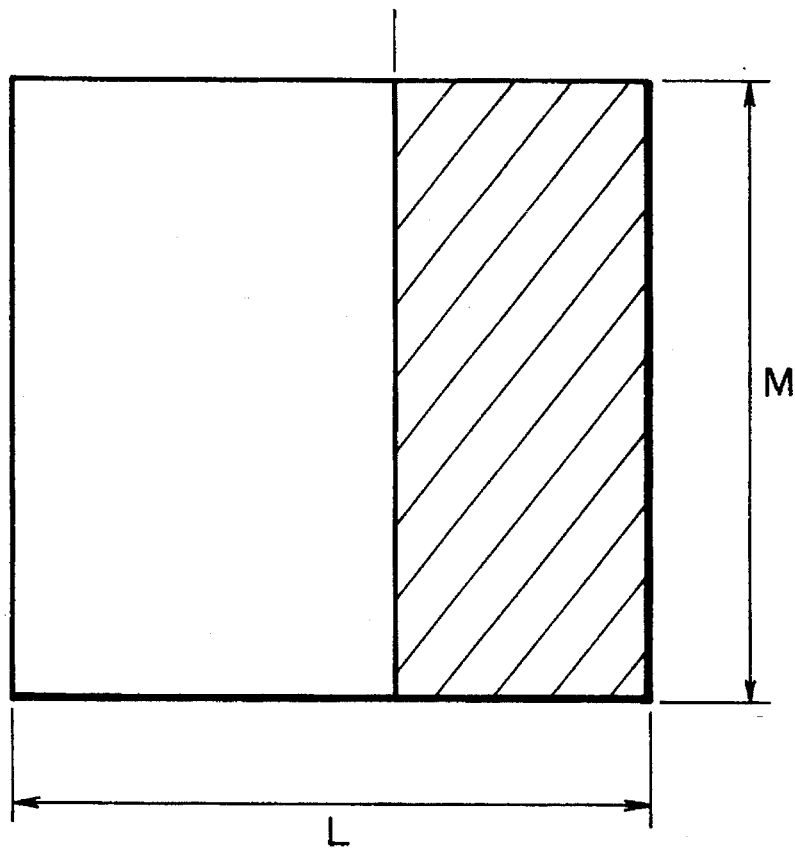

In a pixel having a linear cell thickness gradient as shown in FIG. 2 (schematically reproduced as FIG. 13A), an inverted area in a pixel is proportional to an applied voltage V. Referring to FIG. 13A, within a pixel (having a size of L×M), a length X is taken in the direction of cell thickness change with X=0 (x=0) at the side having the smallest cell thickness and increasing continuously to X=L (x=X/L=1) at the opposite side. If a certain voltage is applied to the pixel, a portion with x=0 (the smallest thickness) to $x=x_0$ is inverted into a white state while leaving the remaining portion ($x=x_0$ to 1) in a black state (erased state). As the pixel size is L×M as shown in FIG. 13B with M at constant, a gradational display is accomplished depending on a ratio of x (=X/L). Thus, the transmittance is 0% when x=0 and 100% when x=1.

If an electric field intensity required for causing an inversion of a ferroelectric liquid crystal is denoted by Eth, the size of region 0 to x causing an inversion by exceeding Eth when supplied with a voltage V may be represented by the following formula (I):

$$x=(V/Eth-d_1)/(d_2-d_1) \quad (I).$$

This formula represents a linear V—T relationship on a graph represented with T and V taken linearly scaled ordinate and abscissa.

On the other hand, in the case where a liquid crystal cell is subjected to a temperature change, it is known that the liquid crystal response speed shows a logarithmic change. This means that a linear T-V characteristic in a graph with a linearly scaled abscissa cannot retain its linearity in response to a temperature change (a T-V characteristic curve cannot be shifted in parallel on the abscissa). The conventional temperature compensation methods (the four pulse method and the pixel shift method) described heretofore require a linear T-V characteristic. Accordingly, in order to apply such a temperature compensation method, it is appropriate to provide a linear T-V characteristic. This is also understood from the fact that a change in Eth due to a temperature change in the following formula can be represented by a parallel shift.

From the above formula (I), the following formula is derived:

$$T=A \log V+B=A \log Eth \cdot d+B$$

On a change from Eth to Eth', $$\begin{aligned} T &= A \log Eth' \cdot d + B \quad (II) \\ &= A \log Eth \cdot d + A \log (Eth'/Eth) + B \\ &= A \log V + C. \end{aligned}$$

Eth'/Eth constitutes a constant term independent of V and is included in the constant C. Thus, the relationship of T-log V retains a constant slope without depending on a temperature change.

Figure 14A:
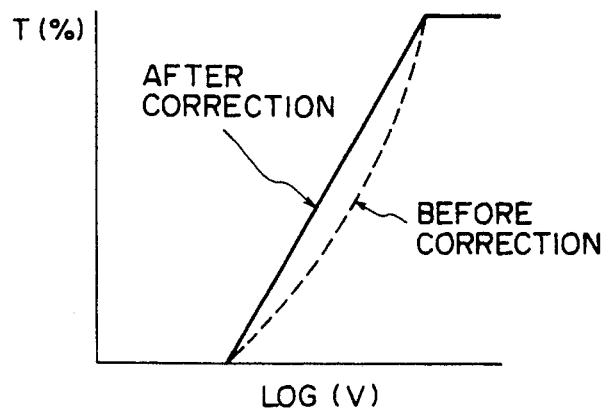
FIG. 14A is a graph showing a change in T-V characteristic according to correction in Example 3.

FIG. 14(a) shows a T-V characteristic curve. In the case of a cell having a linear cell thickness gradient as shown in FIG. 2, a linear relationship is not attained as represented by a dashed line (before correction) in FIG. 14A plotted on a log V abscissa. On the other hand, if the electrode width 1 shown in FIG. 3 is appropriately changed depending on the cell thickness gradient as described with reference to Table 6 blow, a linear relationship as represented by a solid line (after correction) shown in FIG. 14A can be established.

TABLE 6

| Input voltage (volt) | Electrode width ratio | Position (x) | Transmittance (%) | |
|---|---|---|---|---|
| | | | Before correction | After correction |
| 13.3 | 1.22 | 0.05 | 5.0 | 6.1 |
| 14.6 | 1.16 | 0.25 | 25.0 | 29.0 |
| 16.3 | 1.10 | 0.5 | 50.0 | 55.1 |
| 17.9 | 1.05 | 0.75 | 75.0 | 78.5 |
| 19.5 | 1.00 | 1.0 | 100.0 | 100.0 |

The relationship between the input voltage and the position (x) at a pixel shown in Table 6 is linear as represented by the above formula (I). The transmittance before correction and the input voltage or the position (x) is also linear. However, if the electrode widths at the respective positions are multiplied by corresponding electrode width ratio (correction factors) in Table 6, the transmittances after correction show a logarithmic relationship (i.e., linear T-log V relationship).

Even before the correction, the transmitted light quantity can be made identical regardless of the cell thickness as explained within Examples 1 and 2. If the electrode width is further modified by factors shown in Table 6, a T-V characteristic allowing a parallel shift on a log V scale abscissa is obtained.

Figure 14B:
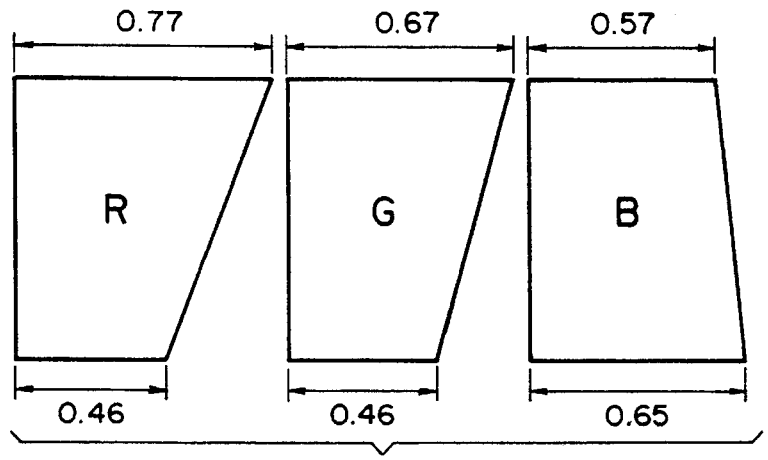
FIG. 14B is an illustration of a pixel structure used therefor.

FIG. 14B shows patterns of electrodes for R, G and B with their relative sizes. In this example, the correction is made to a T-V characteristic but the same correction can be applied to a transmittance (T)—pulse width (ΔT) for expressing a gradation characteristic by taking log (ΔT) on the abscissa.

EXAMPLE 4

Figures 15A, 15B, 15C, 15D:
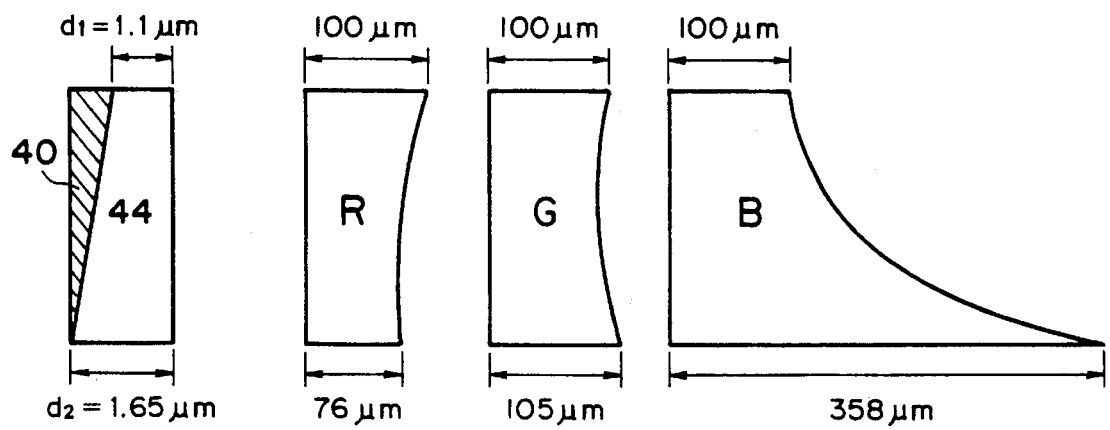
FIGS. 15(a)–15(d) are illustrations of a pixel structure used in a liquid crystal device of Example 4.
Figure 16A:
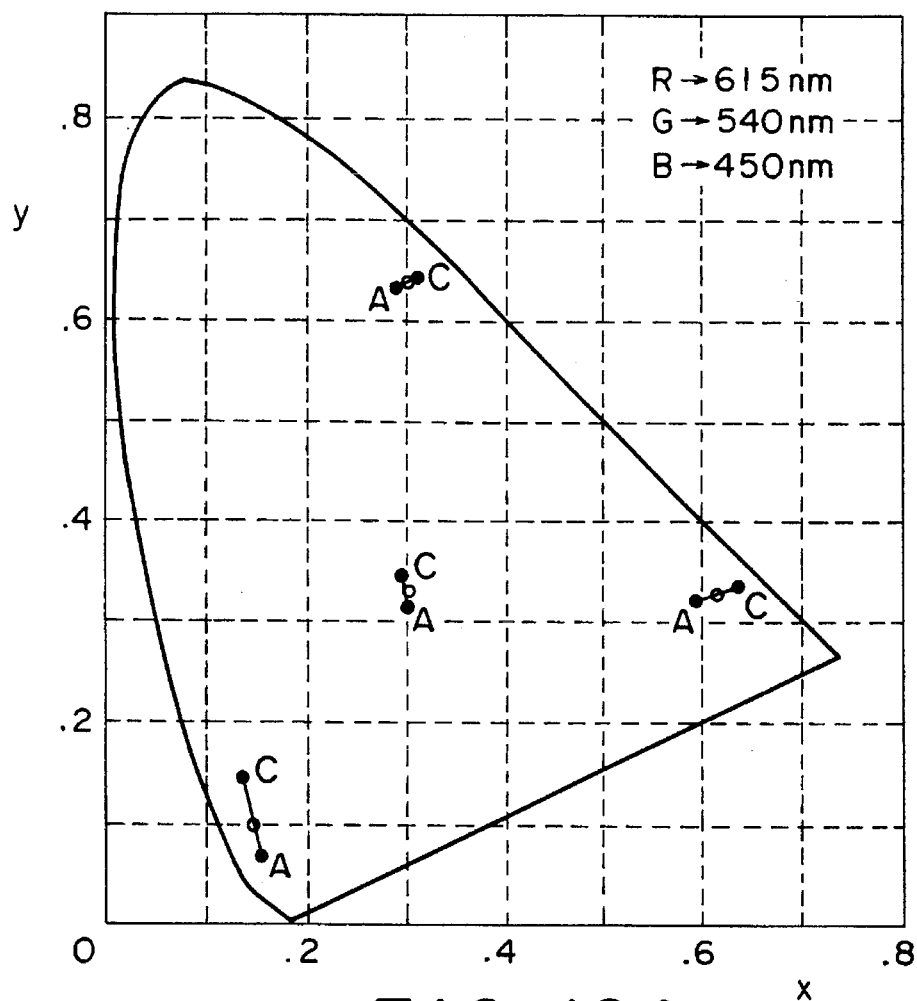
FIGS. 16A and 16B are a chromaticity diagram and a spectral characteristic diagram for describing a liquid crystal device of Example 4.
Figure 16B:
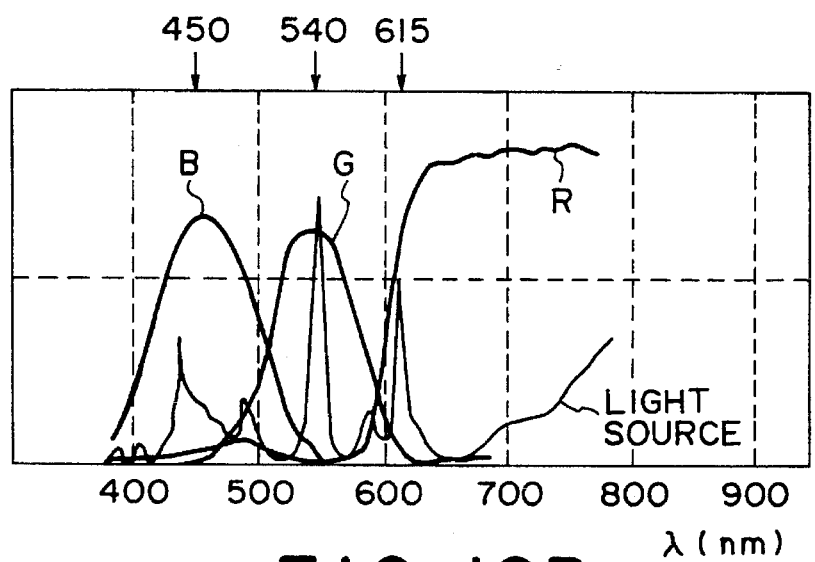

In this example, correction of transmitted light quantity was performed by using a cell having a cell thickness gradient in a pixel and the same dimension as in Example 2 of $d_1=1.1$ µm, $d_2=1.65$ µm and L=200 µm. FIG. 15(a) shows a sectional view of one pixel of the thus prepared liquid crystal cell having a cell thickness continuously changing from $d_1=1.1$ µm to $d_2$—1.65 µm within a pixel. FIG. 16B shows a spectral characteristic of a three-wavelength fluorescent tube as a light source and spectral transmittance characteristic of three color filters of R, G and B used in this Example. The liquid crystal used was the same as in Example 1.

Table 7 below shows a table of transmittances per unit area of the cell at various cell thicknesses and at peak wavelengths (615 nm, 540 nm and 450 nm) of a light transmitted through the respective pixels of R, G and B. The transmittances in Table 7 are shown in relative values with the transmittance at a cell thickness of 1.1 μm for light having a wavelength of nm as the reference (i.e., 1).

TABLE 7

| Cell thickness | Transmittance Tr (area ratio = 1/Tr) | | |
|---|---|---|---|
| | R 615 nm | G 540 nm | B 450 nm |
| 1.10 μm | 1.00 (1.00) | 1.22 (1.00) | 1.29 (1.00) |
| 1.20 μm | 1.10 (0.91) | 1.29 (0.95) | 1.20 (1.08) |
| 1.30 μm | 1.19 (0.84) | 1.32 (0.92) | 1.05 (1.23) |
| 1.40 μm | 1.25 (0.80) | 1.32 (0.93) | 0.87 (1.49) |
| 1.50 μm | 1.30 (0.77) | 1.28 (0.95) | 0.66 (1.95) |
| 1.60 μm | 1.32 (0.76) | 1.21 (1.01) | 0.46 (2.83) |
| 1.65 μm | 1.32 (0.76) | 1.16 (1.05) | 0.36 (3.58) |

As is understood from Table 7, according to a cell thickness change, the balance among transmittances at the three wavelengths is changed. The balance is kept constant if the areal ratios are changed to values in the parentheses in Table 7, which have been determined so as to keep the relative transmittances of 1:1.22:1.29 for the three wavelengths at a cell thickness d=1.1 μm also at the other cell thicknesses. FIG. 15, at (b), (c) and (d), shows shapes of electrodes for R, G and B determined in this way provided that the electrode widths at a cell thickness d=1.1 μm are all set to 100 μm. The electrode widths for the respective electrodes are changed corresponding to the values in the parentheses at the respective thicknesses ranging from 1.1 μm to 1.65 μm.

Figure 17A:
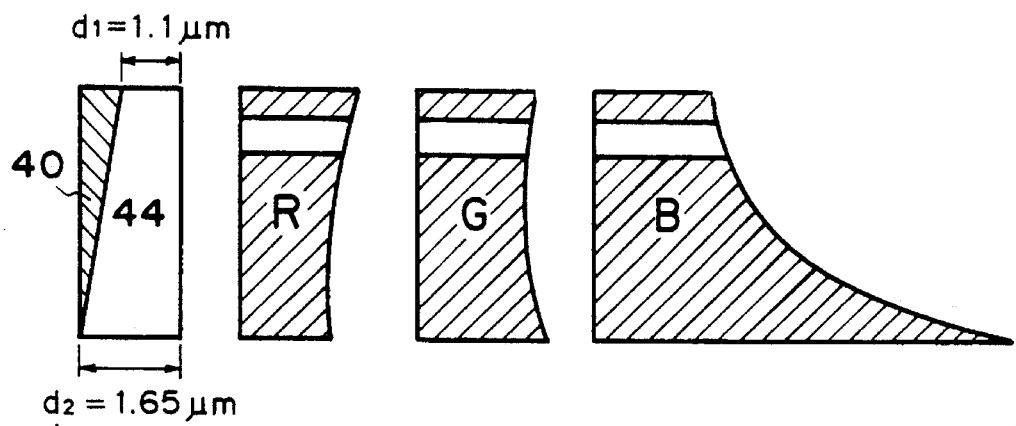
FIGS. 17A–17C are schematic illustrations of display states at pixels in Example 4.
Figure 17B:
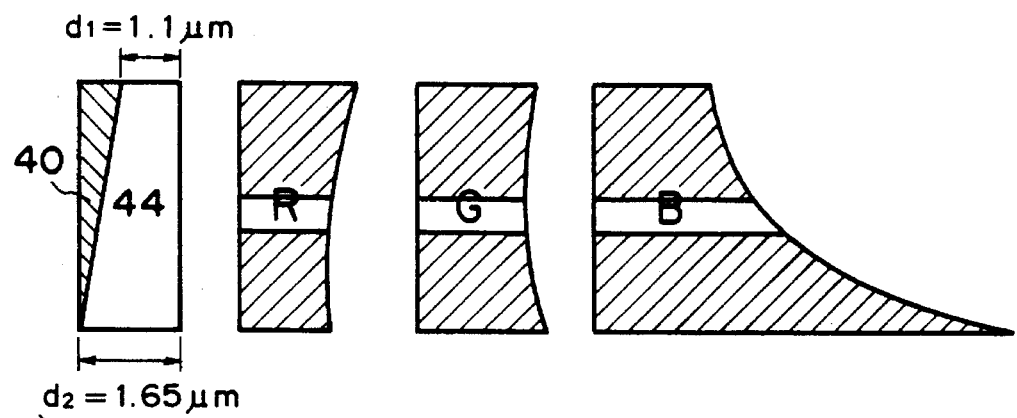
Figure 17C:
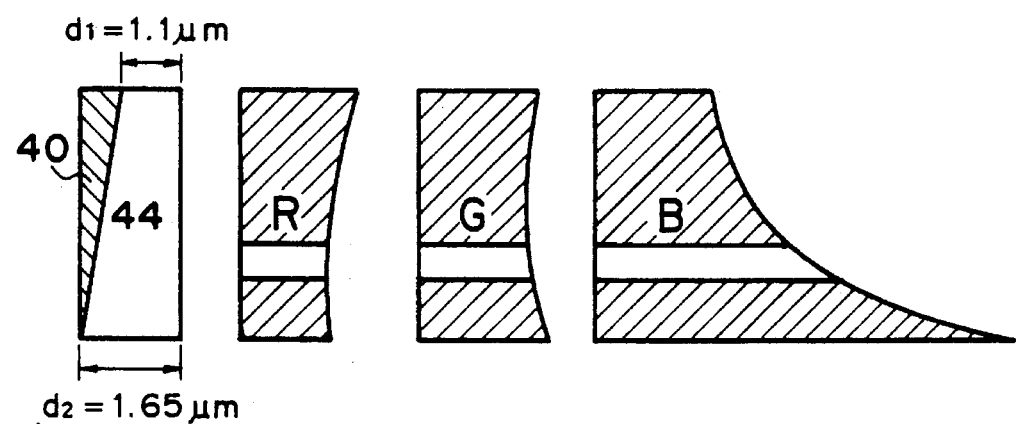

In a specific example, a liquid crystal cell constituted in this manner was driven according to the four pulse method while changing the temperature, and the resultant pixel states were observed through a microscope. Examples of the pixel states thus observed are illustrated in FIGS. 17A–17C. At a low temperature, the transmissive state portions were formed at a relatively small cell thickness as shown in FIG. 17A. On the other hand, at a high temperature, the transmissive state portions were formed at a relatively large cell thickness as shown in FIG. 17C. In order to evaluate the color change due to the movement of such transmissive portions, the R, G and B pixels were turned on one by one and all simultaneously, and the resultant colors were measured by a colorimeter. The color change due to the position of transmissive portions was most noticeable when the transmissive portions were narrow. FIG. 16A shows traces of color changes on a chromaticity diagram in the case of such a most noticeable change during the above experiment. The coordinate points A represent the case of a transmissive portion at a narrow width formed at a low temperature, and the coordinate points C represent the case of a transmissive portion at a thick width formed at a high temperature.

In this way, by constituting pixel patterns so as to keep constant the peak wavelengths of light transmitted through the respective pixels of R, G and B even at a cell thickness change, it was possible to reduce the color change at the time of simultaneously turning on the R, G and B pixels, thereby realizing a good color display.

EXAMPLE 5

This example is directed to an improvement in display characteristic in a system wherein a gradational display is effected by distributing a cell thickness distribution within a pixel so as to form a distribution of electric field intensity applied to a liquid crystal layer within the pixel.

As described above, in the case where a cell thickness distribution (i.e., a liquid crystal layer thickness distribution) is present within a pixel, so that transmitted light intensity through the liquid crystal layer can vary depending on the wavelength. In order to solve this problem, the shapes of color filters were modified depending on the cell thicknesses so as to provide constant transmitted light quantities regardless of the cell thickness change for the respective color filters of R, G and B.

In a practical liquid crystal device, the light source or color filters are not constituted to issue or transmitted monochromatic light.

Further, a light quantity (LL) sensible by human eyes is a quantity obtained by integrating a product of a transmitted light ϕ (λ through a liquid crystal cell and a visual sensitivity ξ(λ) of human eyes at respective wavelengths in the wavelength regions of the respective color filters (e.g., 380 nm–780 nm).

$$LL = k \int_{380}^{780} \xi(\lambda) \cdot \phi(\lambda) d\lambda$$

In the case where the transmitted light quantity at a certain wavelength is made constant regardless of the cell thickness as in Example 1, the sensible light quantity (LL) can be changed depending on the cell thickness.

Further, in the case of effecting a gradational display by the above-mentioned four pulse method or pixel shift method, it is desirable that the portions having different cell thicknesses in a pixel show a constant sensible light quantity (LL). For this reason, in this example, a cell was constituted so that the sensible light quantity for the respective pixels was made constant regardless of the cell thickness change.

Figures 18A, 18B, 18C, 18D:
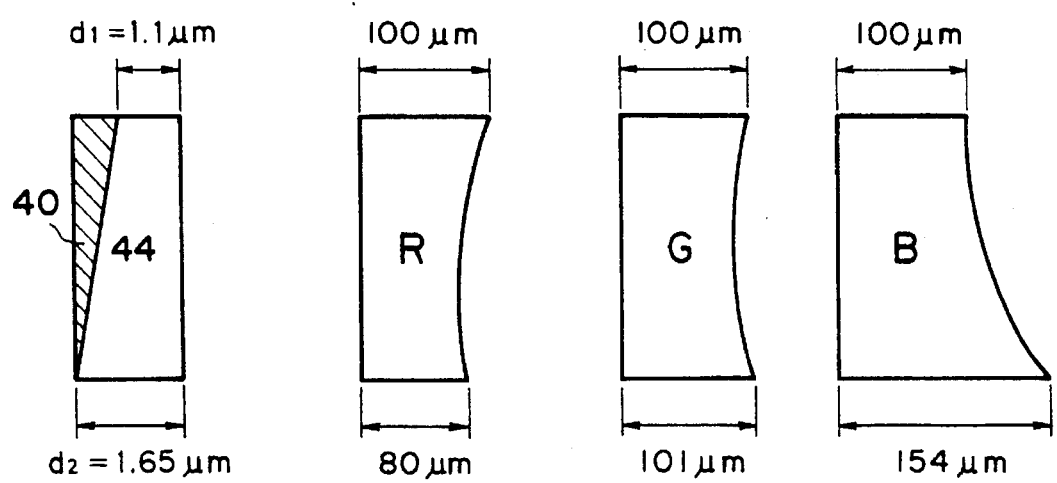
FIGS. 18(a)–18(d) are illustrations of a of a pixel structure used in Example 5.

In this example, correction of transmitted light quantity was performed by using a cell having a cell thickness gradient in a pixel and the same dimensions as in Example 2 of $d_1$=1.1 μm, $d_2$=1.65 μm and L=200 μm. FIG. 18(a) shows a sectional view of one pixel of the thus prepared liquid crystal cell having a cell thickness continuously changing from $d_1$=1.1 μm to $d_2$=1.65 μm within a pixel. The light source and the color filters used in this example were identical to those used in Example 4 and showed spectral characteristics shown in FIG. 16B. The liquid crystal used was the same as in Example 1.

Table 8 below shows a table of sensible light quantities (LL) per unit area of the cell at various cell thicknesses of light issued from the light source and transmitted through the respective color filters (represented by R, G and B together with their peak wavelengths). The sensible light quantities (LL) in Table 8 are shown in relative values with the quantity (LL) at a cell thickness of 1.1 μm transmitted through a pixel with an R filter as the reference (i.e., 1).

TABLE 8

| Cell thickness | Sensible light quantity LL (area ratio = 1/LL) | | |
|---|---|---|---|
| | R 615 nm | G 540 nm | B 450 nm |
| 1.10 μm | 1.00 (1.00) | 2.98 (1.00) | 0.54 (1.00) |
| 1.20 μm | 1.09 (0.91) | 3.16 (0.94) | 0.54 (1.00) |
| 1.30 μm | 1.17 (0.86) | 3.25 (0.92) | 0.52 (1.03) |
| 1.40 μm | 1.22 (0.82) | 3.27 (0.91) | 0.49 (1.10) |
| 1.50 μm | 1.25 (0.80) | 3.20 (0.93) | 0.44 (1.22) |
| 1.60 μm | 1.26 (0.79) | 3.05 (0.98) | 0.38 (1.41) |
| 1.65 μm | 1.26 (0.80) | 2.94 (1.01) | 0.35 (1.65) |

As is understood from Table 8, according to a cell thickness change, the balance among sensible light quantities (LL) through the pixels R, G and B is changed. The balance is kept constant if the areal ratios are changed to values in the parentheses in Table 8, which have been determined so as to keep the relative sensible light quantities of 1:2.98:0.54 for the three types of pixels at a cell thickness d=1.1 μm also at the other cell thicknesses. FIG. 18, at (a), (b), (c) and (d), shows shapes of electrodes for R, G and B determined in this way provided that the electrode widths at a cell thickness d=1.1 μm are all set to 100 μm. The electrode widths for the respective electrodes are changed corresponding to the values in the parentheses at the respective thicknesses ranging from 1.1 μm to 1.65 μm.

Figure 19:
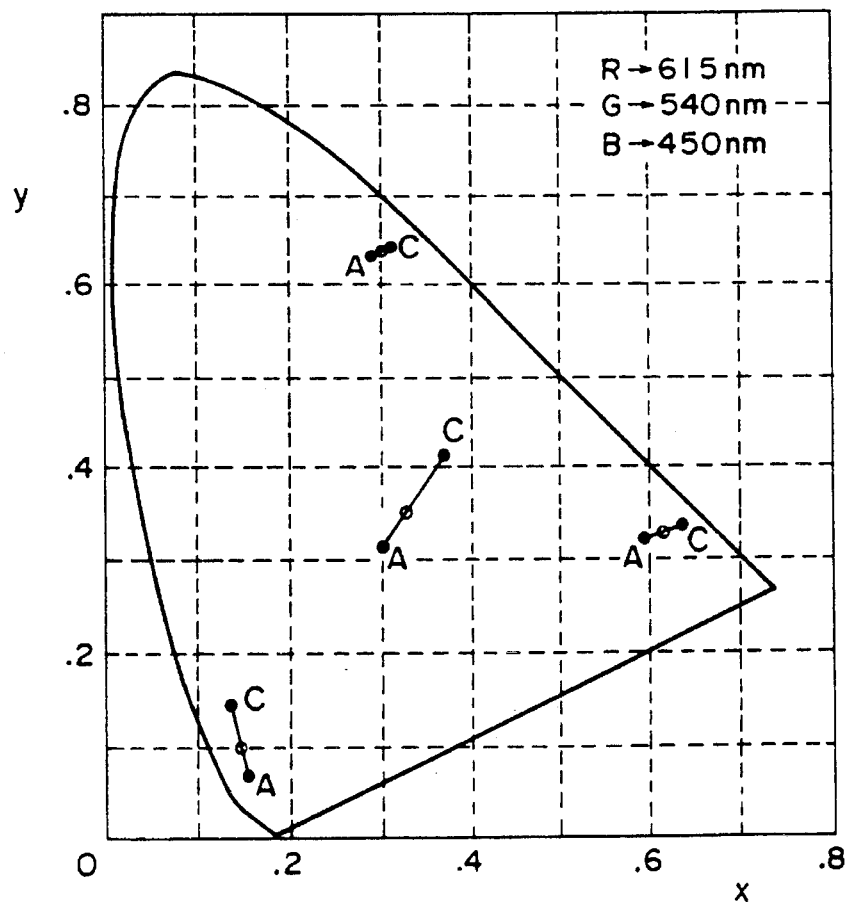
FIG. 19 is a chromaticity diagram for describing a liquid crystal device of Example 5.
Figure 20A:
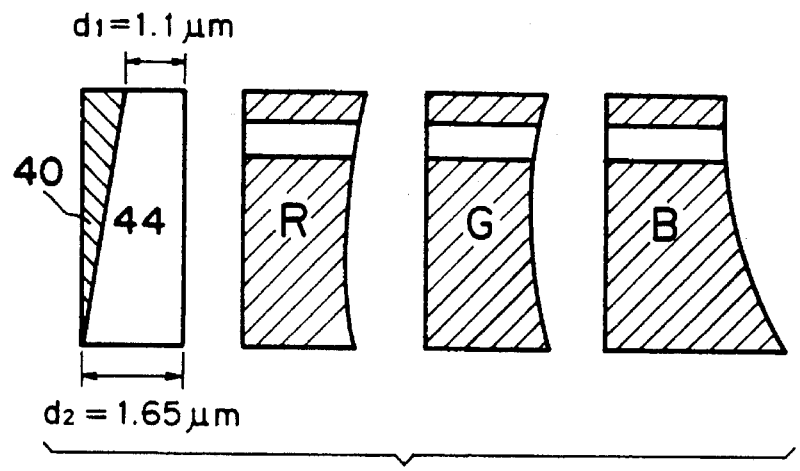
FIGS. 20A–20C are schematic illustrations of display states at pixels in Example 4.
Figure 20B:
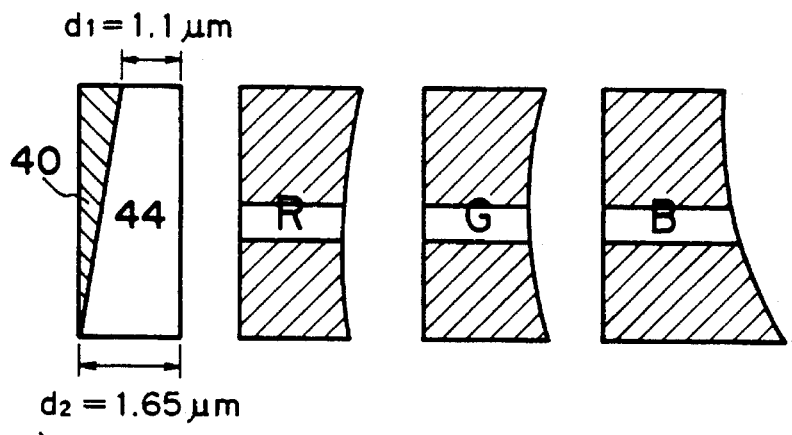
Figure 20C:
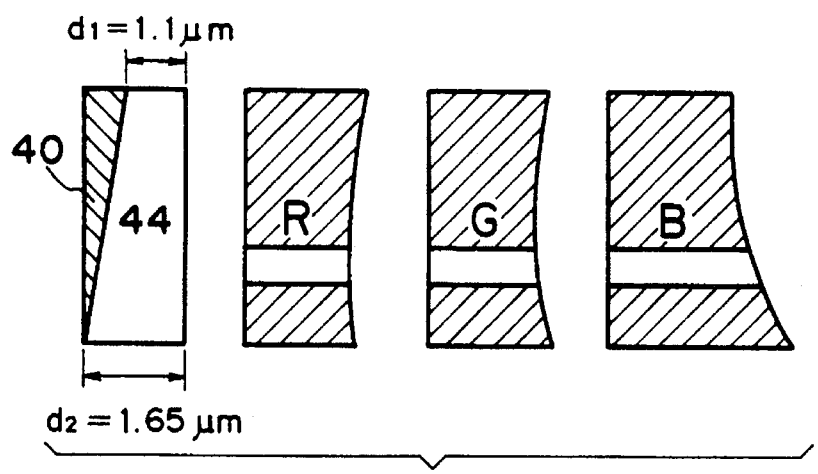

In a specific example, a liquid crystal cell constituted in this manner was driven according to the four pulse method while changing the temperature, and the resultant pixel states were observed through a microscope. Examples of the pixel states thus observed are illustrated in FIGS. 20A–20C. At a low temperature, the transmissive state portions were formed at a relatively small cell thickness as shown in FIG. 20A. On the other hand, at a high temperature, the transmissive state portions were formed at a relatively large cell thickness. In order to evaluate the color change due to the movement of such transmissive portions, the R, G and B pixels were turned on one by one and all simultaneously, and the resultant colors were measured by a colorimeter. The color change due to the position of transmissive portions was most noticeable when the transmissive portions were narrow. FIG. 19A shows traces of color changes on a chromaticity diagram in the case of such a most noticeable change during the above experiment. The coordinate points A represent the case of a transmissive portion at a narrow width formed at a low temperature, and the coordinate points C represent the case of a transmissive portion at a thick width formed at a high temperature.

FIG. 9 shows that the hue A given by a portion at a small thickness and the hue C at a large cell thickness were different from each other.

Even if the color filter shapes are changed so as to make the sensible light quantities constant, a deviation in hue to a cell thickness distribution cannot be corrected.

An improvement to this problem may be given (i) by applying a white clear-black write sequence and a black clear-white sequence alternately to every other scanning line or (ii) by applying a white clear-black write sequence and a black clear-white write sequence to each scanning line in every other frame (vertical scanning). If such a drive scheme is effected, for writing a 10% "white" state for example, the case of writing the 10% "white" portion at a small cell thickness portion and the case of writing the 10% "white" portion at a large cell thickness portion is averaged positionally (i) or with time (ii), whereby substantially no difference (difference between +mark and o mark in FIG. 21) is left as shown in FIG. 1. Accordingly, even when a "white" domain is shifted from a large cell thickness portion to a small cell thickness portion due to a change in threshold accompanying a temperature change (when a temperature is changed while retaining a constant electric field distribution within a pixel) during drive according to the pixel shift method, substantially no change in "hue" is caused thereby.

As a result, during a drive such as the pixel shift method or the four pulse method using a liquid crystal including a cell thickness gradient within a pixel, it was possible to obtain good display characteristics without causing a change in sensible light quantity (LL) or hue.

As described above, it has become possible to realize a ferroelectric liquid crystal display device showing good color characteristic and gradation characteristic by changing the area or width of an electrode or a color filter.

Figure 21:
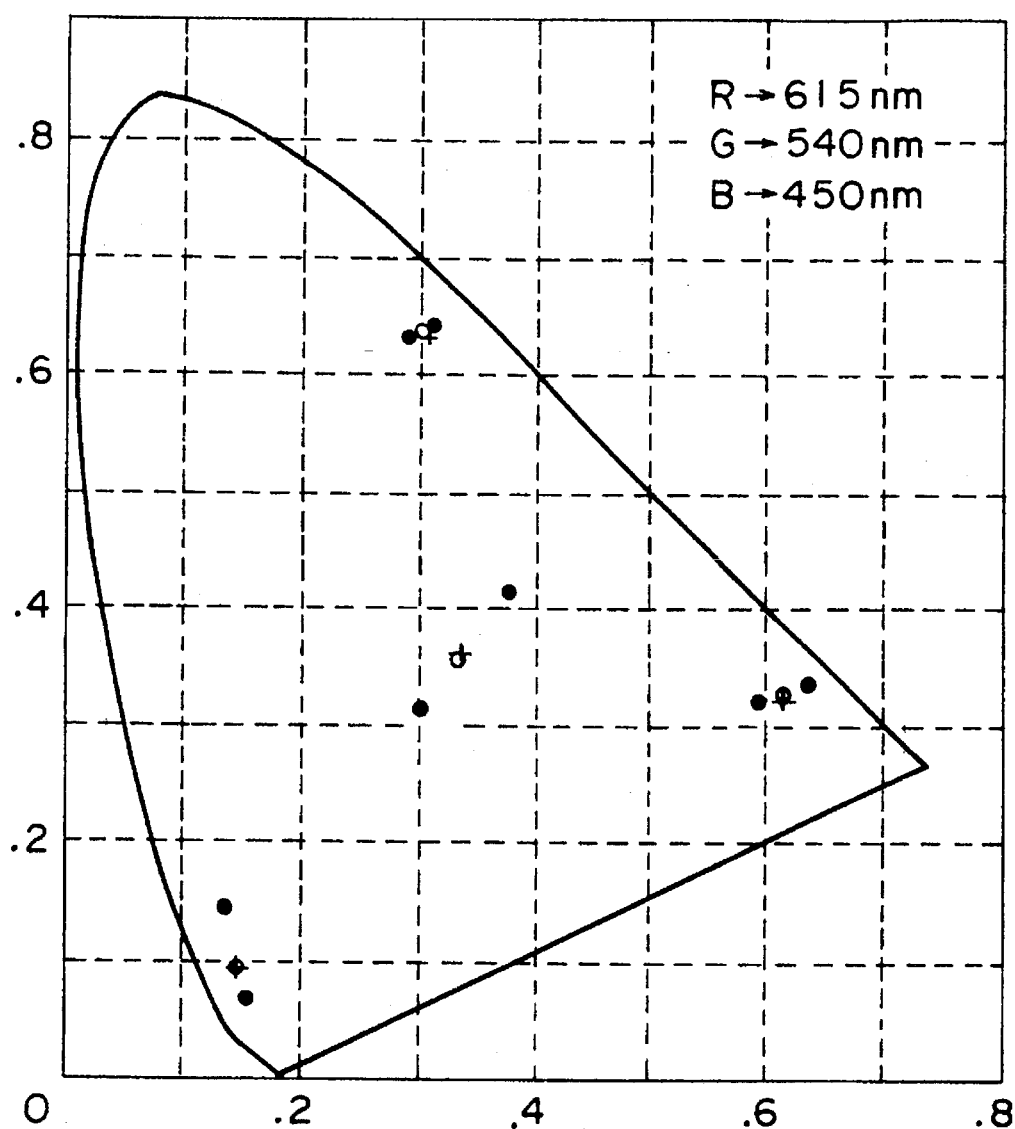
FIG. 21 is a chromaticity diagram for illustrating a modification of Example 21.

FIG. 21 is a block diagram of drive system for a display apparatus according to an embodiment of the present invention.

Scanning lines of a liquid crystal device 141 constituting a display panel are connected to a common-side drive IC 146 as a means for selecting a scanning line and applying thereto a selection signal and data lines are connected to a segment-side drive IC 143 as a means for applying gradation data signals.

Image data from an image data generator 148, such as an image sensor or a wireless receiver, are divided by a controller 149 into common-side signals and segment side signals, which are then supplied to a common-side circuit and a segment-side circuit, respectively. In the common side, scanning signals are produced by a shift register 147 and the drive IC 146 based on reference voltages distributed by an analog switch in a drive power supply unit 142.

On the other hand, in the segment side, digital gradation signals supplied through a shift register 145 and a latch circuit 144 are converted into analog signals by a D/A converter in the drive IC 143 and supplied to the data lines. For example, four bit digital signals may be converted into $2^4$, i.e., 16 different analog signals.

In this embodiment, digital signals are latched before conversion into analog signals. Alternatively, it is also possible to adopt a system wherein capacitors are disposed in parallel with the drive IC 14 so as to directly latch the analog signals.

The present invention has been described based on some embodiments but need not be restricted to such embodiments. Accordingly, the disclosed members and materials may be replaced by equivalents thereof within the scope of the present invention.

What is claimed is:

1. A liquid crystal display device, comprising:

a pair of electrode plates disposed opposite to each other and each having at least one electrode on an opposite side thereof, a liquid crystal layer disposed between the electrode plates and a layer of color filters so as to form a multiplicity of color pixels including first color pixels and second color pixels having mutually different colors, each color pixel comprising a color filter, the liquid crystal layer and a pair of electrodes sandwiching the liquid crystal, wherein each color pixel assumes a bright or a dark state depending on a voltage applied thereto, has a locally varying liquid crystal layer thickness therein and has a width varying depending on the change in thickness of the liquid crystal layer therein, and the widths of the first and second color pixels vary in mutually different manners depending on the change in liquid crystal layer thickness.

2. The liquid crystal display device according to claim 1, wherein the liquid crystal layer within a pixel is caused to have different thicknesses and the shape of the pixel is varied corresponding to the different thicknesses.

3. A device according to claim 1, wherein each pixel has an area defined as a superposed portion of a pair of electrodes disposed respectively on the pair of electrode plates.

4. A device according to claim 2, wherein each pixel is defined as a superposed portion of a pair of electrodes disposed respectively on the pair of electrode plates.

5. A device according to claim 2, wherein each pixel is defined as a superposed portion of a color filter and a pair of electrodes disposed respectively on the pair of electrode plates.

6. A device according to claim 1, wherein said liquid crystal comprises a nematic liquid crystal or a smectic liquid crystal.

7. A device according to claim 1, wherein each electrode plate comprises an insulating substrate and a plurality of transparent generally stripe-shaped electrodes.

8. A device according to claim 1, further comprising a circuit for generating gradational display signals applied to said pixels.

9. A device according to claim 1, further comprising a backlight.

10. A device according to claim 1, wherein said backlight comprises a three-wavelength fluorescent tube.

11. A device according to claim 1, wherein said plurality of pixels include at least three types of pixels of red, green and blue.

12. A liquid crystal display device, comprising: a pair of electrode plates each having a plurality of elongated electrodes, and a layer of ferroelectric liquid crystal disposed between the electrode plates so as to form a pixel at each intersection of elongated electrodes disposed respectively on the pair of electrodes plates, wherein at least one electrode plate is provided with an unevenness at each pixel so as to form a cell thickness gradient within each pixel, at least one electrode plate is provided with at least three types of color filters each corresponding to a pixel, so as to form a display unit by plural pixels, and each pixel has a differential area varying depending on a local cell thickness so that said plural pixels include a pixel having a differential area which decreases along with an increase in local cell thickness and a pixel having a differential area which increases along with an increase in local cell thickness.

13. A liquid crystal display device, comprising:

a pair of electrode plates disposed opposite to each other and each having at least one electrode on an opposite side thereof, a liquid crystal layer disposed between the electrode plates and a layer of color filters so as to form a multiplicity of color pixels including red color pixels, green color pixels and blue color pixels, each color pixel comprising a color filter, the liquid crystal layer and a pair of electrodes sandwiching the liquid crystal, wherein each color pixel assumes a bright or a dark state depending on a voltage applied thereto, has a locally carrying liquid crystal layer thickness therein and has a width varying depending on the change in thickness of the liquid crystal layer therein, and the widths of the red, green and blue color pixels vary in mutually different manners depending on the change in liquid crystal layer thickness.

\* \* \* \* \*

UNITED STATES PATENT AND TRADEMARK OFFICE
CERTIFICATE OF CORRECTION

PATENT NO. : 5,552,911
DATED : September 3, 1996
INVENTOR(S) : SHINJIRO OKADA ET AL.

It is certified that error appears in the above-identified patent and that said Letters Patent is hereby corrected as shown below:

Drawings:
SHEET 5 OF 15

FIG. 9, "HEDIUM" should read --MEDIUM--.

Drawings:
SHEET 15 OF 15

Figure 22:
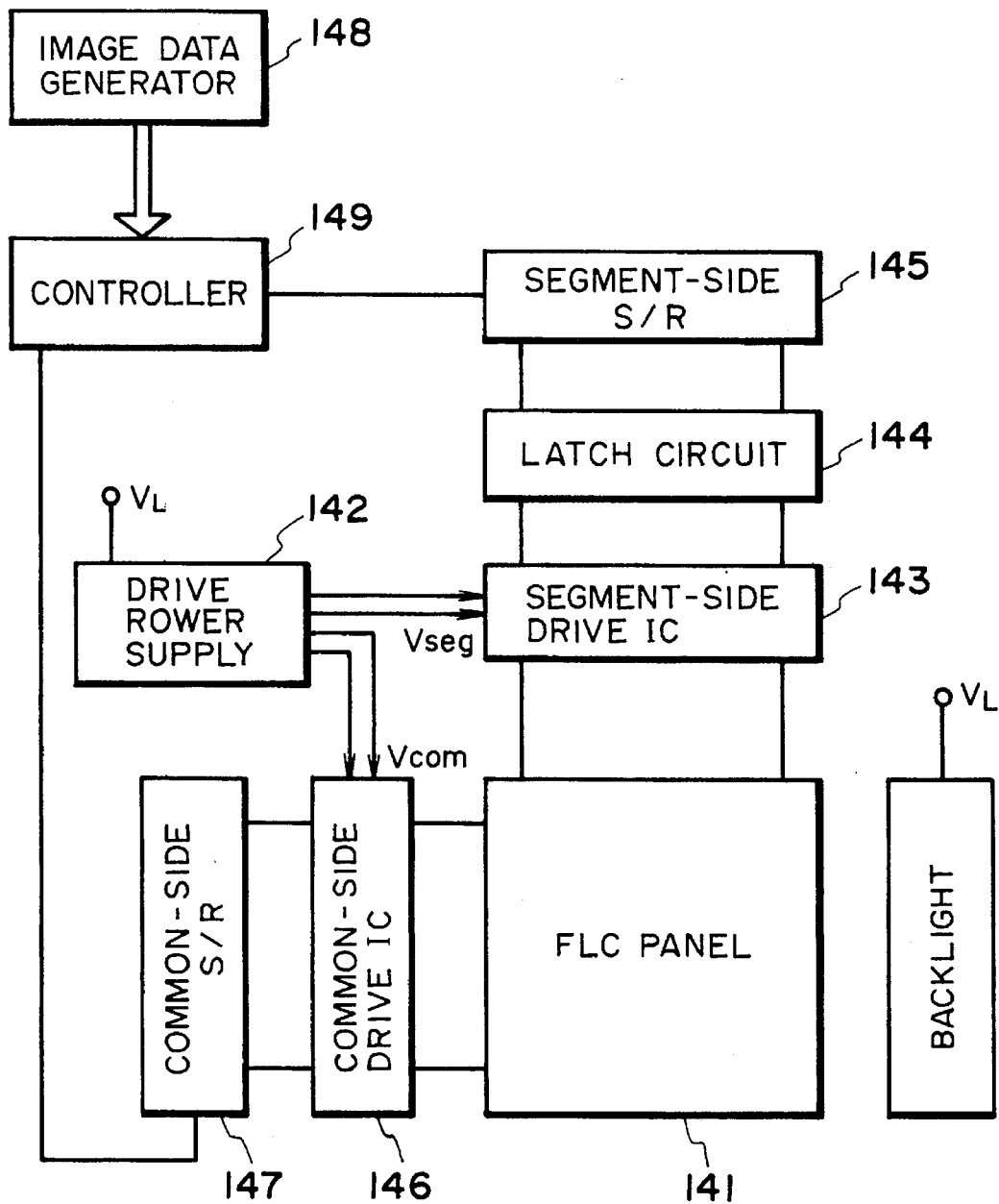
FIG. 22 is a drive system block diagram of a liquid crystal display apparatus according to the invention.

FIG. 22, "ROWER" should read --POWER--.

COLUMN 1

Line 14, "quest-host-type" should read --guest-host-type--.

COLUMN 2

Line 59, "of a" (second occurrence) should be deleted.

COLUMN 5

Line 1, "tin" (first occurrence) should be deleted.
    Line 21, "substrate" should read --substrates--.
    Line 51, "a real" should read --areal-- and "(light" should read --(light- --.

COLUMN 6

Line 35, "the" should read --the "--.
    Line 47, "leftside" should read --left side--.

UNITED STATES PATENT AND TRADEMARK OFFICE
CERTIFICATE OF CORRECTION

PATENT NO. : 5,552,911
DATED : September 3, 1996
INVENTOR(S) : SHINJIRO OKADA ET AL.

It is certified that error appears in the above-identified patent and that said Letters Patent is hereby corrected as shown below:

COLUMN 7

Line 46, "large" should read --larger--.

COLUMN 8

Line 12, "was formed" should be deleted.

COLUMN 9

Line 41, "width" should read --widths--.
Line 66, "$d_2$-1.65 $\mu$m" should read --$d_2$=1.65 $\mu$m--.

COLUMN 10

Line 8, "nm" should read --610 nm--.

COLUMN 12

Line 66, "$d_2$-1.65 $\mu$m" should read --$d_2$=1.65 $\mu$m--.

COLUMN 13

Line 11, "nm" should read --615 nm--.

COLUMN 14

Line 20, "transmitted" should read --transmit--.
Line 25, "($\lambda$" should read --($\lambda$)--.

UNITED STATES PATENT AND TRADEMARK OFFICE
CERTIFICATE OF CORRECTION

PATENT NO. : 5,552,911
DATED : September 3, 1996
INVENTOR(S) : SHINJIRO OKADA ET AL.

It is certified that error appears in the above-identified patent and that said Letters Patent is hereby corrected as shown below:

<u>COLUMN 16</u>

Line 17, "FIG. 21" should read --FIG. 22--.
    Line 42, "drive IC 14" should read --DRIVE IC 143--.

<u>COLUMN 17</u>

Line 8, "claim 2," should read --claim 1,--.
    Line 11, "claim 2," should read --claim 1,--.

Signed and Sealed this

Eleventh Day of February, 1997

Attest:

BRUCE LEHMAN

Attesting Officer                Commissioner of Patents and Trademarks